United States Patent
Vaggalis et al.

(10) Patent No.: US 12,230,055 B2
(45) Date of Patent: Feb. 18, 2025

(54) METHODS FOR CREATING PERSONALIZED ITEMS USING IMAGES ASSOCIATED WITH A SUBJECT AND RELATED SYSTEMS AND COMPUTERS

(71) Applicant: Keepsake Tales Inc., Raleigh, NC (US)

(72) Inventors: Mike Vaggalis, Raleigh, NC (US); Erin Burchik, Lilburn, GA (US); John Petitte, Raleigh, NC (US); Paulo Rieck, Timbo (BR); Christina Dill, Ocilla, GA (US); Paulo de Tarso Oliveira da Silva, Macapa (BR)

(73) Assignee: Keepsake Tales Inc., Raleigh, NC (US)

( * ) Notice: Subject to any disclaimer, the term of this patent is extended or adjusted under 35 U.S.C. 154(b) by 378 days.

(21) Appl. No.: 17/669,541

(22) Filed: Feb. 11, 2022

(65) Prior Publication Data
US 2022/0254188 A1 Aug. 11, 2022

Related U.S. Application Data

(60) Provisional application No. 63/148,345, filed on Feb. 11, 2021.

(51) Int. Cl.
*G06K 9/00* (2022.01)
*G06T 11/60* (2006.01)
(Continued)

(52) U.S. Cl.
CPC ........... *G06V 40/165* (2022.01); *G06T 11/60* (2013.01); *G06V 10/255* (2022.01);
(Continued)

(58) Field of Classification Search
CPC .. G06V 40/165; G06V 10/255; G06V 40/103; G06V 40/171; G06V 40/172; G06T 11/60
See application file for complete search history.

(56) References Cited

U.S. PATENT DOCUMENTS

2008/0215964 A1 9/2008 Abrams et al.
2008/0215985 A1 9/2008 Batchelder et al.
(Continued)

FOREIGN PATENT DOCUMENTS

| WO | WO-2020150686 A1 * | 7/2020 | ................ G06N 3/04 |
| WO | WO-2020150691 A1 * | 7/2020 | ................ G06T 1/00 |
| WO | WO-2020150692 A1 * | 7/2020 | ............ G06F 3/0482 |

OTHER PUBLICATIONS

Recurrent Neural Networks for Emotion Recognition in Video, Samira Ebrahimi Kahou et al., ACM, 2015, pp. 467-474 (Year: 2015).*

(Continued)

*Primary Examiner* — Jayesh A Patel
(74) *Attorney, Agent, or Firm* — Stanek Lemon Crouse & Meeks, PA

(57) ABSTRACT

Methods for creating personalized items using images associated with a subject are provided. The method includes receiving and processing at least one image of a subject; translating the processed at least one image into a personalized illustration having features that substantially resemble features of the subject, wherein translating the processed at least one image comprises extracting a plurality of core shapes from a face of the subject in the at least one image and assembling the extracted plurality of core shapes into a face of the personalized illustration; and manipulating the personalized illustration of the subject for placement in a personalized item such that the manipulated personalized illustration appears as an integral part of an existing template of the personalized item.

21 Claims, 28 Drawing Sheets

(51) Int. Cl.
*G06V 10/20* (2022.01)
*G06V 40/10* (2022.01)
*G06V 40/16* (2022.01)

(52) U.S. Cl.
CPC .......... *G06V 40/103* (2022.01); *G06V 40/171* (2022.01); *G06V 40/172* (2022.01)

(56) References Cited

U.S. PATENT DOCUMENTS

| | | |
|---|---|---|
| 2012/0066573 A1 | 3/2012 | Berger et al. |
| 2013/0145240 A1 | 6/2013 | Anderson et al. |
| 2015/0143209 A1* | 5/2015 | Sudai .................... G06F 40/186 715/202 |
| 2016/0070952 A1* | 3/2016 | Kim ........................ G06T 17/00 382/118 |
| 2018/0018819 A1* | 1/2018 | Hwang ................... G06T 15/04 |
| 2018/0047200 A1* | 2/2018 | O'Hara ................ G06V 10/242 |

OTHER PUBLICATIONS

EmotionCues: Emotion-Oriented Visual Summarization of Classroom Videos, Haipeng Zeng et al., IEEE, 2019, pp. 3168-3181 (Year: 2019).*

Avatar Digitization From a Single Image For Real-Time Rendering, Liwen Hu et al., ACM, 2017, pp. 195:1-195:14, (Year: 2017).*

International Search Report and Written Opinion, PCT/US2022/016063, May 19, 2022, 8 pages.

* cited by examiner

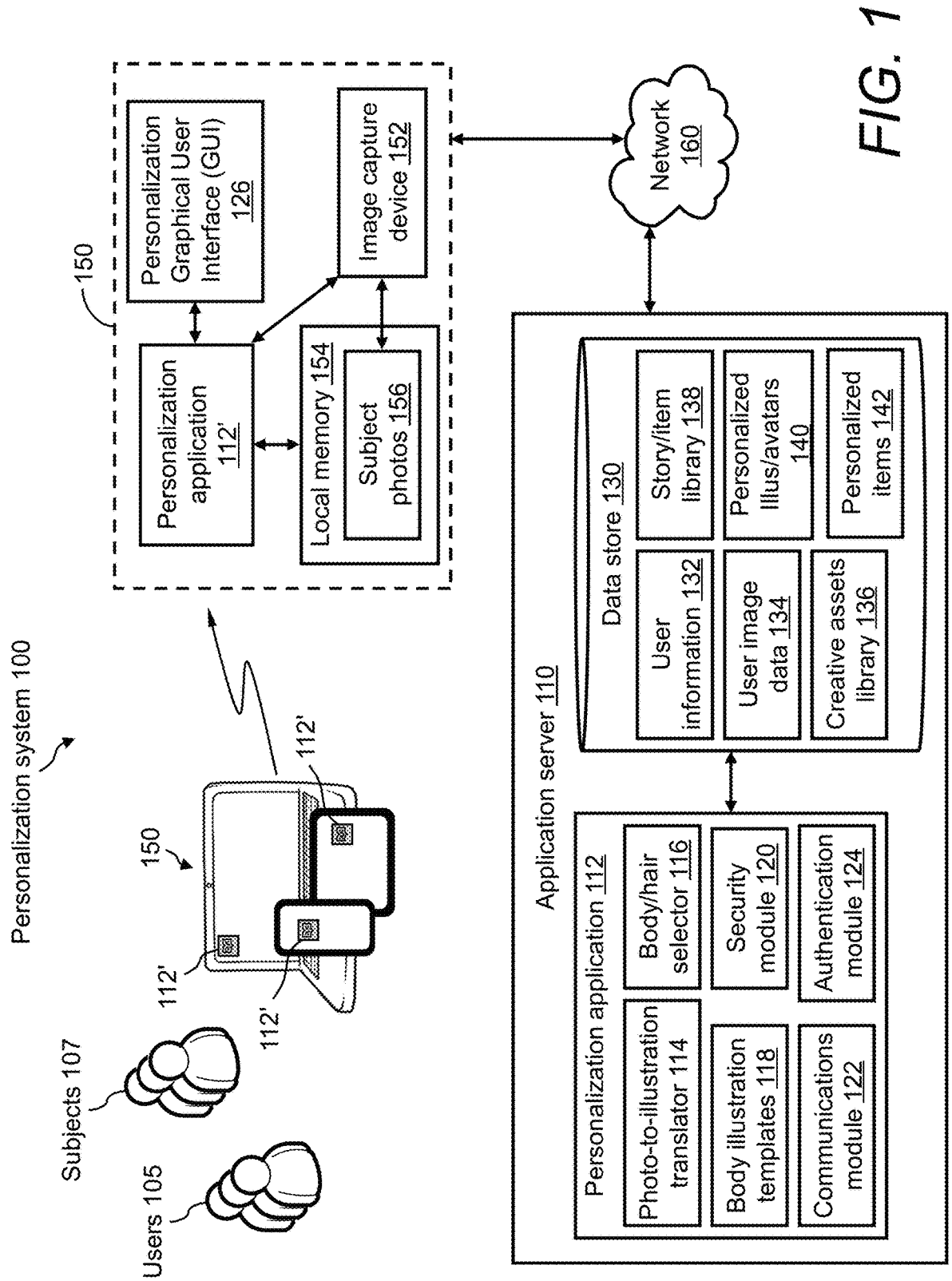

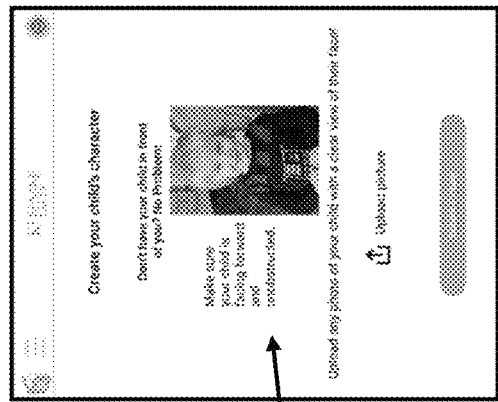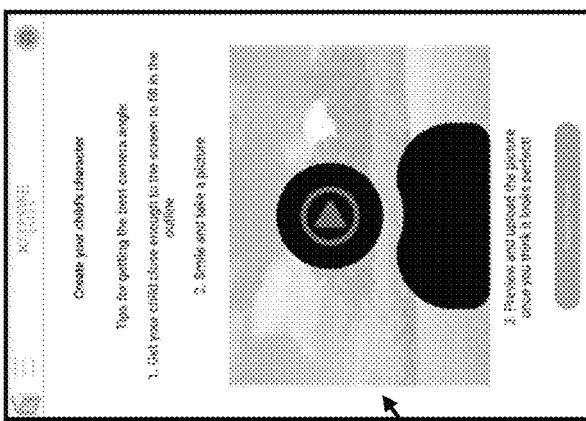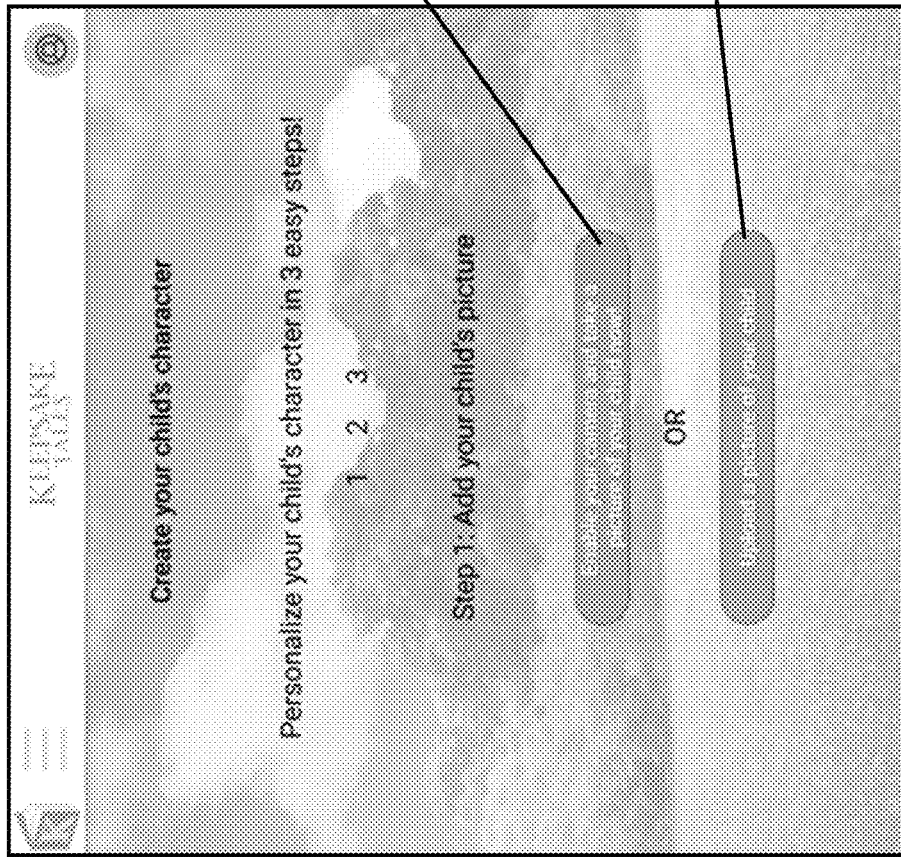
FIG. 10

Screenshot 1120

Screenshot 1225

Screenshot 1330

Screenshot 1435

Screenshot 1540

METHODS FOR CREATING PERSONALIZED ITEMS USING IMAGES ASSOCIATED WITH A SUBJECT AND RELATED SYSTEMS AND COMPUTERS

CLAIM OF PRIORITY

The present application claims the benefit of and priority to U.S. Provisional Application No. 63/148,345, filed on Feb. 11, 2021, entitled Personalization System and Method for Providing a Personalization Platform, the content of which is hereby incorporated herein by reference as if set forth in its entirety.

FIELD

The present application relates generally to a personalization platform and, more particularly to, a personalization platform that can be used to create personalized items.

BACKGROUND

Currently, various examples of personalized children's books exist. Some children's books can include personalized text and/or graphics. In one example, factual information about a child is provided and then the text is personalized to feature the child as a character in a story and individual physical characteristics of the selected child are superimposed onto a pre-printed, relatively generic, background of illustrations. Books produced in this manner may include personalization features, such as a name in text and certain other basic features in the overprinted graphics (i.e., skin tone and hair color).

In another example of a personalized children's book, a completely pre-bound blank board book is utilized with personalized stickers that are printed and affixed to the pages of the board book. In this example, the publisher provides personalized stickers based on personal information provided by the purchaser. The publisher prepares personalized stickers and forwards them to the purchaser. The purchaser inserts the stickers into the appropriate blank spaces in the book. The storyline text in these books is personalized to a certain degree, however, the illustrations are not personalized.

In still another example, a software program containing a generic story is loaded into a computer at the point of sale. Personalized data from a customer is entered into the program and merged into the story. In this example, some personalization of the generic storyline text is provided, but no personalization of the illustrations or of the cover are provided.

SUMMARY

Some embodiments of the present inventive concept provide methods for creating personalized items using images associated with a subject. The method includes receiving and processing at least one image of a subject; translating the processed at least one image into a personalized illustration having features that substantially resemble features of the subject, wherein translating the processed at least one image comprises extracting a plurality of core shapes from a face of the subject in the at least one image and assembling the extracted plurality of core shapes into a face of the personalized illustration; and manipulating the personalized illustration of the subject for placement in a personalized item such that the manipulated personalized illustration appears as an integral part of an existing template of the personalized item.

In further embodiments, manipulating may include one or more of adjusting emotion of the personalized illustration to reflect a mood of the personalized item; adjusting a location of the personalized illustration on the personalized item to integrate with the existing template of the personalized item; aligning the personalized illustration on the personalized item so the personalized illustration is facing in an appropriate direction to integrate with the personalized item; and adjusting a size of the personalized illustration to match relative sizes of elements depicted on the personalized item.

In still further embodiments, the plurality of core shapes may include at least one of a face shape, a nose shape, eye shapes and ear shapes. The method further includes assembling the extracted plurality of core shapes into the face of the personalized illustration.

In some embodiments, the method may further include customizing at least one of a skin tone of the face, an eye color of the subject and a hair style of the subject.

In further embodiments, the method may further include selecting a body type representative of the subject; and completing the personalized illustration of the subject by associating the face with the selected body type.

In still further embodiments, each aspect of the face and the body type of the personalized illustration is customizable.

In some embodiments, the body type may include one or more of tall, thin, short, wide, in a wheel-chair, having a prosthetic limb, having an orthopedic cast, having crutches and having mobility aids. Customizing the face may include adding cochlear implants, hearing aids, glasses, freckles, cleft palate, beauty marks and/or braces.

In further embodiments, the method may further include customization of the personalized illustration by a user.

In still further embodiments, translating the processed at least one image may further include recognizing the extracted plurality of core shapes from the face of the subject; matching the recognized extracted plurality of core shapes of the face of the subject to corresponding core shapes in an asset library of existing facial assets; and assembling the matched core shapes into the face of the personalized illustration.

In some embodiments, the asset library of existing facial assets may be continually updated with more facial assets.

In further embodiments, the manipulated personalized illustration may be highly representative of the subject and cohesive with a background illustration of the personalized item.

In still further embodiments, the at least one image of the subject may be one of a digital photograph or a digital representation of a physical photograph.

In some embodiments, the personalized item may include a children's book, a non-children's book, magazine, coloring book, keychain, phone case, phone grip, mouse, mousepad, laptop case, pillow, bean bag, tableware, drinkware, bottle opener, lunch box/bag, back pack, calendar, greeting card, stationary, invitation, journal, notebook, folder, notecard, notepad, stickers, pencil, print, poster, wall art, wall decal, yearbook, woodcut, ornament, keepsake box, jewelry, luggage, tote bag, hat, clothing, blanket, towel, mask, toy, party favor, marketing material and/or electronic image.

In further embodiments, the personalized item may be a book. In these embodiments, the personalized illustration is integrated on pages of the book such that the personalized illustration appears as an integral part of the pages of the book.

Related personalization systems and computers are also provided.

BRIEF DESCRIPTION OF THE DRAWINGS

FIG. 1 is a block diagram illustrating a system for personalization of items in accordance with some embodiments of the present inventive concept.

FIGS. 7 through 17 are screenshots of various stage of a graphical user interface (GUI) for item personalization in accordance with some embodiments of the present inventive concept.

DETAILED DESCRIPTION

Figures 2A, 2B:
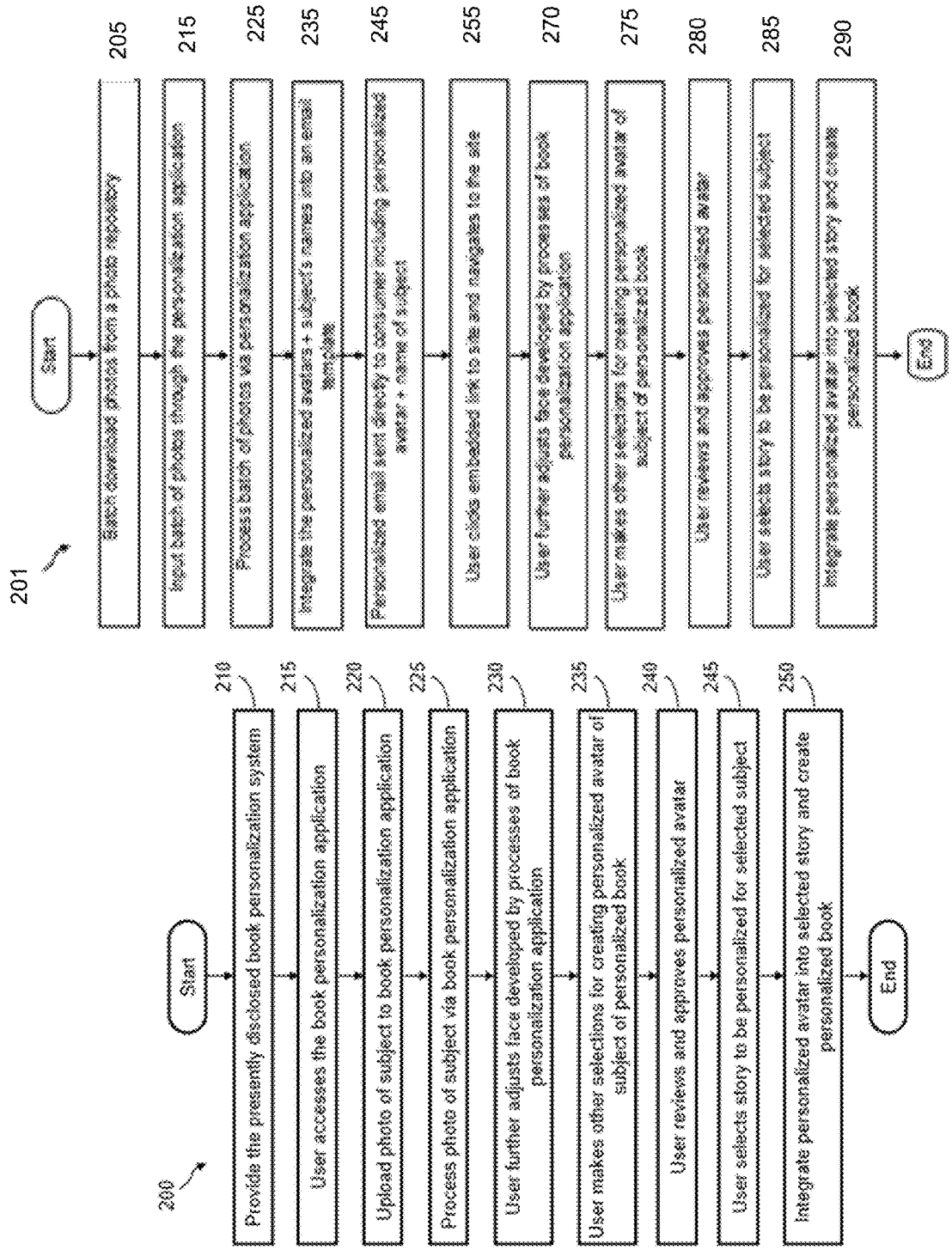
FIG. 2A is a flowchart illustrating operations of the personalization system for providing a personalized children's book in accordance with some embodiments of the present inventive concept.
FIG. 2B is a flowchart illustrating operations of a method of using the presently disclosed personalization system for providing a personalization platform wherein a base photo-input is subject to the personalization platform to populate the base character and that character is used as an input in a personalized and targeted, marketing campaign direct to a consumer in accordance with some embodiments of the present inventive concept.

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items. Similarly, as used herein, the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Reference will now be made in detail in various and alternative example embodiments and to the accompanying figures. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

As discussed above, many personalized products are available on the market including personalized books. However, many of these books do not include illustrations that are both highly representative of the child/subject and cohesive with the background illustration style of the story. Thus, new approaches are needed with respect to creating personalized books and items that allow any child/subject to view themselves as an integral part of story.

Accordingly some embodiments of the present inventive concept provide methods for creating a personalized item using one or more images associated with the subject. The one or more images are translated into a personalized illustration of the subject using core shapes present in the face of the subject in the images. Once the personalized illustration is created and customized, the personalized illustration may be incorporated into a personalized item, such as a book, such that the personalized illustration appears as if it were always present therein. In other words, some embodiments of the present inventive concept adjust the personalized illustration so that it appears as an "integral part" of the existing template, for example, pages of the book. The items created according to embodiments discussed herein may not suffer from the various draw backs of the existing personalized items discussed above as will be discussed further herein.

Furthermore, some embodiments of the present inventive concept provide methods and systems for creating a personalized illustration and positioning that personalized illustration into or onto a personalized item. When positioned, the personalized illustration appears as a seamlessly or "visually integrated" part of the background element(s) of the personalized item or the personalized item itself as if the personalized illustration has always been there as a "cohesive" portion of the personalized item in contrast to conventional personalized illustrations that are applied to or physically integrated into a medium without regard to visual integration. That is, the present inventive concept provides physical and visual integration of the personalized illustration into or onto a personalized item to provide a final cohesive product as will be discussed further below.

Although personalized children's books are discussed throughout the present application, embodiments of the present inventive concept are not limited to children's books. Any item that can be personalized in accordance with embodiments discussed herein may be used without departing from the scope of the present inventive concept. As used herein, a "personalized item" may include, but is not limited to, a children's book, a non-children's book, magazine, keychain, phone case, phone grip, mouse, mousepad, laptop case, pillow, bean bag, tableware, drinkware, bottle opener, lunch box/bag, back pack, calendar, greeting card, stationary, invitation, journal, notebook, folder, notepad, stickers, pencil, print, poster, wall art, wall decal, yearbook, woodcut, ornament, keepsake box, jewelry, luggage, tote bag, hat, clothing, blanket, towel, mask, toy, party favor, marketing material and/or electronic image.

As used herein, a "personalized illustration" refers to any illustration created in accordance with embodiments discussed herein including a cartoonized illustration as well as a more photo-realistic illustration of the subject. A cartoonized illustration may resemble the subject but look more like a cartoon character (See FIG. 5B). In contrast, a photo-realistic personalized illustration may resemble a more human representation of the subject (FIG. 4B) as will be discussed further below with respect to the figures.

Some embodiments of the present inventive concept provide methods of creating a personalization platform that can be used to create items including a personalized image of the subject. The inventive concept further provides a personalization platform and various personalized items created by using the personalization platform.

In some embodiments, the personalized item may be a book and the system may include a book personalization system and method for providing a children's book personalization platform by which a personalized children's book may be created in which a selected child may be the subject and/or main character of his/er own personalized book.

In some embodiments, the book personalization system and method provide a book personalization computer application that may be used to process one or more photos (for example, a digital or a picture of a physical photo) of, for example, a child and then translate the photo to an illustration of the child that substantially resembles the facial and/or body features of the child and wherein the personalized illustration (or avatar) may be used, for example, to create a personalized children's book in which the child may be the main character or a supporting character of the personalized book.

In some embodiments, the book personalization system and method provide a book personalization computer application that may include, for example, a photo-to-illustrations translator and/or a body/hair selector that may be used to translate the photo of, for example, a child to, for example, a cartoonized and personalized illustration (or avatar) of the child that substantially resembles the facial and/or body features of the child.

In some embodiments, the book personalization system and method provide a book personalization computer application that may include, for example, a photo-to-illustrations translator and/or a body/hair selector that may use (1) a vectorized approach, and/or (2) a machine learning (matching) approach to process, for example, the child's photo and then extract the core "shapes" from the face, for example, face shape, nose shape, eye shapes, ear shapes, and the like, skin tone, and/or body type and then generate a personalized illustration (or avatar) of the child that substantially resembles the facial and/or body features of the child.

As discussed above, while a book personalization system and method is described hereinbelow with respect to providing a children's book personalization platform for creating children's personalized books, this is provided for example only. Embodiments of the present inventive concept may provide a platform for creating other types of personalized items and books, such as, but not limited to, personalized books for any subject of interest including, but not limited to, adults, families, pets, and the like.

Referring now to FIG. 1, a block diagram illustrating a personalization system 100 in accordance with some embodiments of the present inventive concept will be discussed. As discussed above, the system 100 may include a book personalization system 100 for providing a children's book personalization platform in some embodiments. However, embodiments of the present inventive concept are not limited to providing a children's book personalization platform only. The personalization system 100 may be used to provide any type of personalization platform without departing from the scope of the present inventive concept.

As illustrated in FIG. 1, the personalization system 100 may include an application server 110 that further includes a personalization application 112 and a data store 130. The personalization application 112 may include, for example, a photo-to-illustrations translator 114, a body/hair selector 116, a set of body illustration templates 118, a security module 120, a communications module 122, and an authentication module 124. Stored in data store 130 may be, for example, user information 132, user image data 134, a creative assets library 136, a story library 138, personalized avatars 140, and a collection of personalized books 142.

It will be understood that the modules illustrated in FIG. 1 as part of the application server 110 are provided as examples only. Modules may be combined and/or expanded or new modules may be added without departing from the scope of the present inventive concept.

Referring again to FIG. 1, a plurality of users 105 and subjects 107 may be associated with the personalization system 100. The users 105 may be any individuals or groups of individuals seeking to create, for example, a personalized item, such as a children's book that is personalized to a certain child, i.e., the subject 107. In some embodiments, the users 105 are parents, relatives or caregivers and the subjects 107 are the children or other relation of the users 105. The users 105 and/or the subjects 107 may access application server 110 using a personal computing device 150, such as a computer, tablet or portable electronic device. The computer device 150 is connected to the application server 110 via a network 160. Personal computing devices 150 may be any computer devices, such as, but not limited to, desktop computers, laptop computers, handheld computing devices, mobile phones (or smartphones), tablet devices, smartwatches, and the like. Furthermore, the network 160 may be any type of network, wired or wireless etc.

The application server 110 can be any networked computing configuration as long as it is accessible via network 160 by the personal computing devices 150 of the users 105 and/or the subjects 107. For example, the personalization system 100, and more particularly the personalization application 112, may support a cloud computing environment in some embodiments. In a cloud computing environment, the application server 110 is a cloud server. Furthermore, the personalization application 112 is not limited to running on one application server 110 only. The personalization system 100 may include multiple application servers 110 (or cloud servers) in order to ensure high-availability of computing resources without departing from the scope of the present inventive concept.

In some embodiments, the personalization system 100 may be implemented using a client-server architecture in which the application server 110 is the server and the user computers 150 are the clients. Accordingly, the personalization application 112 at the application server 110 represents the server side of the client-server architecture and a personalization application 112' at each of the user computers 150 represents the client side of the client-server architecture. Accordingly, the personalization application 112' at the user computers 150 is the counterpart to the personalization application 112 at the application server 110. However, the personalization system 100 is not strictly limited to this configuration. In some embodiments, each of the user computers 150 can act as a private server that is part of the overall network of personalization systems 100.

Again, each user computer 150 may include the personalization application 112'. Further, the personalization application 112' has a personalization graphical user interface (GUI) 126. In embodiments where the user computer 150 being, for example, a desktop computer or laptop computer, the personalization application 112' may be a desktop application. However, in the embodiments where the user computer 150 is, for example, a mobile phone, a smartphone, a tablet device, a smartwatch, and the like, the personalization application 112' may be a mobile application.

Further, each user computer 150 may include an image capture device 152 and a certain amount of local memory 154. In some embodiments, subject photos 156 from image capture device 152 may be stored in local memory 154. Subject photos 156 may be, for example, the digital photos of subjects 107, for example child subjects. However, the subject photos may also be an image of physical photo is some embodiments. Image capture device 152 may be, for example, a built-in camera of user computer 150, such as the onboard digital camera of a smartphone or tablet device. In some embodiments, the image capture device 152 may be a digital camera that is separate from user computer 150. Subject photos 156 from image capture device 152 may be stored in local memory 154 in any standard or proprietary image file format, for example, joint photographic experts group (JPEG), tagged image file format (TIFF), bitmap (BMP), and the like.

In the personalization system 100, the network 160 may be, for example, a local area network (LAN, wired or wireless), a wide area network (WAN), and/or a cellular network for connecting to the Internet or to an Intranet. The application server 110 and the user computers 150 may connect to the network 160 by any wired and/or wireless means.

In some embodiments, vector based or machine learning image generation techniques may be used for illustration personalization of both the face and body. Illustration personalization means, for example, creating personalized body animations. Photo-to-illustrations translator 114 and body/hair selector 116 of book personalization application 112 may be the primary components for performing illustration personalization in the process of creating, for example, a children's personalized book from a photo of a child.

The photo-to-illustrations translator 114 of the personalization application 112 may be, for example, certain technology that is provided that uses a photo as a base input and then translates that photo to an illustration that is able to integrate into a body illustration template 118. A body illustration template 118 may be selected from a variety of body type styles, for example, tall, skinny, short, broad, wheel-chair, prosthetic limb, orthopedic cast, crutches, other mobility aids, and the like.

The photo-to-illustrations translator 114 may translate from a digital photo to an illustration using one or more of the following: (1) a vectorized approach, (2) a machine learning (matching) approach, and/or (3) both the vectorized approach and the machine learning (matching) approach.

In the vectorized approach, the photo-to-illustrations translator 114 processes a digital image of, for example, a child (e.g., subject photos 156) in order to extract the core "shapes" from the face, for example, face shape, nose shape, eye shapes, ear shapes, and the like. Then, the photo-to-illustrations translator 114 reassembles those vectors into, for example, a cartoonized and personalized face. In the vectorized approach, the photo-to-illustrations translator 114 also extracts the skin-tone from the face in the photo and applies it to the illustrated face.

In the machine learning (matching) approach, the photo-to-illustrations translator 114 recognizes different facial features, for example, face shape, nose shape, eye shapes, ear shapes, etc.) and then "matches" the input photo, for example, subject photos 156, to the correct permutation of pre-created facial assets. These pre-created facial assets may be developed by an illustrator. These pre-created facial assets may be some of the contents of creative assets library 136 in data store 130 of the personalization application 112.

Furthermore, the machine learning (matching) approach of the photo-to-illustrations translator 114 may be based on a trained artificial neural network (ANN), also called neural network (NN). Generally, an ANN or NN is based on a collection of connected units or nodes called artificial neurons, which loosely model the neurons in a biological brain. Each connection, like the synapses in a biological brain, can transmit a signal to other neurons. An artificial neuron that receives a signal then processes it and can signal neurons connected to it. The "signal" at a connection is a real number, and the output of each neuron is computed by some non-linear function of the sum of its inputs. Neural networks learn (or are trained) by processing examples, each of which contains a known "input" and "result," forming probability-weighted associations between the two, which are stored within the data structure of the net itself. In some embodiments, the algorithmic architecture may include an approach based on a generative adversarial networks (GAN) that utilizes two neural networks acting in an adversarial manner in order to generate the new image.

Such systems "learn" to perform tasks by considering examples, generally without being programmed with taskspecific rules. In the personalization application 112, for example, using image recognition, the photo-to-illustrations translator 114 may learn to identify images that contain facial features (e.g., face shape, nose shape, eye shapes, ear shapes, etc.) by analyzing example images that have been manually labeled as "facial feature" or "no facial feature" or, more specifically, "eye" or "no eye" and using the results to identify facial features in other images. This may be done in the photo-to-illustrations translator 114 with no prior knowledge of facial features. Instead, the photo-to-illustrations translator 114 may automatically generate identifying characteristics from the examples that it processes.

The body/hair selector 116 of book personalization application 112 may use, for example, a method wherein the user 105 is able to create a body illustration template 118 that represents the subject 107, for example, their child. The body/hair selector 116 provides various assets needed to "build" different body types (e.g., wheelchair, prosthetic, cochlear implants, etc.) in an easy-to-use user experience (UX). These body/hair assets may be some of the contents of creative assets library 136.

An aspect of the personalization application 112 may be to limit the translation of, for example, a child's photo to a personalized illustration with respect to the degree of photo-realism. For example, a highly photo-realistic translation process may not be desired because personalized illustrations approaching complete realism may distort imagination and create confusion and/or anxiety for the actual child depicted in the book upon viewing the same. However, embodiments of the present inventive concept include both cartoonized and photo-realistic personalized illustrations. This can be selected by the user 105.

The security module 120 of personalization application 112 may be used to perform any system security functions with respect to keeping the contents of, for example, the personalization application 112 and the data store 130 secure. The security module 120 may use standard security techniques, such as encryption, secure hashtags (or hash tags), and the like. Additionally, the communications module 122 may be used to manage any communications that takes place within the personalization system 100. The communications module 122 may utilize the security module 120 to ensure that any information exchanged within the personalization system 100 is done so in a secure manner.

The authentication module 124 of the personalization application 112 may be used to manage the authentication process of users 105 of the personalization system 100. For example, when the user 105 signs into personalization application 112, a standard authentication process is performed that allows the user 105 to access the personalization application 112. User-sign in may occur a number of ways. In some embodiments, the personalization application 112' is a desktop application and user 105 uses a web browser to access the personalization application 112' and enters his/her credentials (e.g., username and password). In further embodiments, the personalization application 112' is a mobile app that user 105 uses to enter his/her credentials.

The data store 130 may be, for example, data repositories (like databases) and/or flat files that can store data. Further, the personalization system 100 is not limited to one data store 130. The personalization system 100 may include multiple data stores 130 without departing from the scope of the present inventive concept.

As users 105 join the personalization system 100, user information is stored in user information 132 in the data store 130. The user information 132 may contain, for example, account information, user names, user credentials, and the like. Further, user image data 134 in data store 130 may include the subject photos 156 from, for example, the user's image capture device 152 or photos or pictures of photos uploaded by the user 105.

The creative assets library 136 in the data store 130 may be, for example, a library of pre-designed creative assets that may be used to assemble the correct "facial and body combinations." For example, the creative assets library 136 may include facial assets that correspond to various facial features (e.g., face shape, nose shape, eye shapes, ear shapes, etc.), hair assets that correspond to hair type, body type assets (e.g., wheelchair, prosthetic, cochlear implants, etc.), and the like.

In embodiments where the system is a book personalization system, the story library 138 in the data store 130 may be, for example, a collection of illustrated stories. Each story may include multiple pages. Each page of the story may provide an illustrated background and/or scene in which, for example, a personalized illustration may be inserted or integrated. Further, the personalized illustration or avatar may be generated to correspond to a certain action and/or emotion depicted in the selected story illustration. It should be noted that the collection of illustrated stories can include original stories created by the user, publisher and others as well as well-known or classic tales. The personalization platform of the present inventive concept allows the development of a personalized illustration or avatar that fits seamlessly within the illustration style of the well-known or classic literature.

Personalized items 143/books 142 in the data store 130 may be, for example, any completed or in-progress personalized item, for example, books that have been created or are still being worked on by users 105 and/or subjects 107. For example, a personalized item 142 may be a personalized children's book about a certain subject 107 (e.g., a certain child) who may be the main character of his/her own personalized book 142.

In the personalization system 100, generally the inputs to the personalization application 112 with respect to creating, for example, personalized books 142 may be as follows:

(1) subject photos 156 of, for example, subjects 107;
(2) the processes of the photo-to-illustrations translator 114 and/or body/hair selector 116;
(3) the contents of creative assets library 136 including a collection of pre-designed creative assets that may be used to assemble the correct "facial and body combinations;" and
(4) story/item library 138 including a collection of illustrated items/stories, the stories may include one or more pages of certain backgrounds and/or scenes.

Generally, the output of the personalization application 112 may be personalized avatars 140 of respective subjects 107 integrated into their respective personalized items 142. The personalized illustration/avatar 140 may be a cartoonized and personalized illustration (or avatar) of the selected subject (i.e., selected child subject 107) that substantially resembles the facial and/or body features of the child.

Furthermore, in the personalization system 100, the personalization GUI 126 of the personalization application 112' at user computer 150 may provide a streamlined, intuitive, and fun user experience (UX). A user 105 may use the personalization GUI 126 to incorporate the appropriate hair style and body type, in combination with the facial output, to create a full body avatar of a certain subject 107.

Referring now to FIG. 2A, a flowchart illustrating an example of a method 200 of using the presently disclosed personalization system 100 shown in FIG. 1 for providing a children's book personalization platform will be discussed.

Operations of the method 200 begin at block 210 by providing the book personalization system in accordance with some embodiments of the present inventive concept. For example, the personalization system 100 shown and described in FIG. 1 may be provided.

A user accesses the personalization application of personalization system 100 (block 215). For example, a certain user 105 may access the system and sign into the personalization application 112/112' using his/her user computer 150.

A photo of the subject is uploaded to the personalization application of the personalization system 100 (block 220). For example, via the personalization application 112/112' at user computer 150, the user 105 may be prompted to take and upload at least one subject photo 156 of the subject (i.e., the subject 107) that includes a full view of the subject's face. For example, one or more subject photos 156 that include a full view of the subject's face may be taken using, for example, the image capture device 152. Then, the resulting subject photos 156 may be stored locally at user computer 150 and also transmitted to the personalization application 112 at the application server 110. Further, the subject photos 156 may be stored in user image data 134 of the data store 130 at application server 110. Examples of photos 156 are provided in FIGS. 4A and 5A. It will be understood that the photo(s) may be uploaded from an external device or may be a picture of a physical photograph without departing from the scope of the present inventive concept.

The personalization application processes the photo(s) of the subject and develops the face of the subject (block 225). For example, the photo-to-illustrations translator 114 of the personalization application 112 uses image processing methods to process the subject photo 156 of the subject in order to:

(A) Recognize the face shape of a subject (for instance: oval, square, heart), the eye shape (for instance: standard, narrow, almond), and the nose shape (for instance: long, short, wide). The photo-to-illustrations translator 114 algorithm may be trained to recognize other elements of a face as well (for instance: hair style) as well;

(B) Categorize the subject's face based on the correct definition of face, eye, and nose shapes (for instance, a subject with an oval face, almond eyes and a short nose may be appropriately categorized as face type: OAS);

(C) Assemble the correct permutation of facial assets into a fully developed face; and (D) Assign the correct skin and eye color, based on the photo input. In some embodiments, the skin and eye color may be set via user input instead of the algorithm.

The user further adjusts the face developed by the processes of the personalization application 112 (block 230). For example, the user 105 may be invited to adjust the face (e.g., using body/hair selector 116) to more closely reflect the subject (i.e., the subject child 107), as follows:

(A) Hair: using the creative assets library 136, the user 105 may scroll through a library of hair styles to be added to the face of the subject; and (B) Unique Features: using the creative assets library 136, the user 105 may add any unique features for the subject (e.g., freckles, beauty marks, glasses, braces, cochlear implants, cleft palate, etc.).

The user makes other selections for creating the personalized avatar of the subject of the personalized book (block 235). For example, the user 105 makes other selections for creating the personalized avatar 140 of the subject (i.e., the subject 107) who is the subject of the personalized book 142. More particularly, the user 105 creates the body of the subject using the personalization application 112. For example, the user 105 may be able to create (e.g., using body/hair selector 116) the base body type as follows:

(A) Base body: using the creative assets library 136, the user 105 may scroll through a library of body types (e.g., tall/thin, short/wide, wheelchair, etc.) to create the base body type; and (B) Unique Features: using the creative assets library 136, the user 105 may add any unique features for their child (e.g., prosthetic arm, diabetes pump, etc.).

The user reviews and approves the creation of their personalized avatar (block 240). For example, the user 105 may be prompted to review and approve the creation of the personalized avatar 140 of the subject, for example, their child (i.e., the subject 107) who is the subject of the personalized book 142.

Figure 4B:
FIGS. 4B and 5B are examples of personalized illustrations (natural and cartoonized) produced in accordance with some embodiments of the present inventive concept.
Figure 5C:
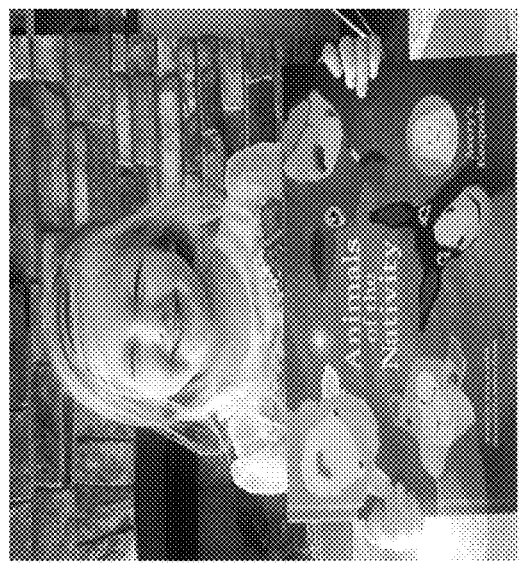
Figure 5B:
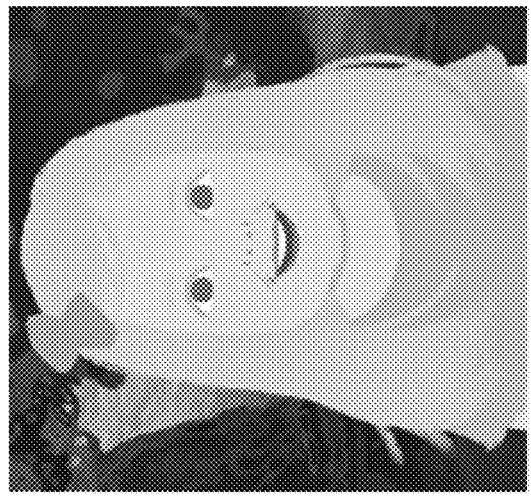

The user selects a story to be personalized for the selected subject (block 245). For example, the user 105 selects a story from the story library 138 to be personalized for their child (i.e., the subject 107) using the personalized avatar 140 of the child. An example of a personalized book 142 using the story titled "Eli Climbs Mount Jungle" is shown in FIG. 4B. This avatar is more photo-realistic rather than cartoonized. FIG. 5B provides an example of a cartoonized and highly personalized illustration (or avatar) of the child that substantially resembles the facial features of the child, which can be modified as desired by the user. The book with the cartoonized child is show in FIG. 5C.

The personalized avatar is integrated into the selected story and the personalized book is created. For example, using the personalization application 112, the personalized avatar 140 of the child (i.e., the subject 107) may be integrated automatically into the selected story from story library 138 based on the prescriptions set by the user 105. For example, the integration may incorporate several components, such as, but not limited to, the following.

(A) Emotion adjustment: The sentiment of the character must fit the need for that page of a story (e.g., happy, sad, etc.);

(B) Location on page: e.g., foreground/background;

(C) Alignment on page: e.g., facing forward, backward, sideways, etc.; and (D) Proportion: The size of the personalized avatar 140 must match the need for the page.

Figure 4C:
FIGS. 4C and 5C illustrate examples of personalized books created using the personalized illustrations of FIGS. 4C and 5C, respectively, in accordance with some embodiments of the present inventive concept.
Figure 4A:
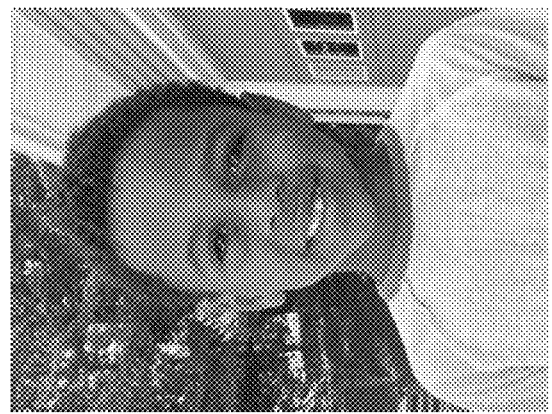
FIGS. 4A and 5A are images illustrating examples of a subject photo to be processed in accordance with some embodiments of the present inventive concept.
Figure 5A:

FIG. 4C illustrates an "Eli Climbs Mount Jungle" personalized book 142. In this example, the subject 107 shown in FIG. 4A is the main character of the "Eli Climbs Mount Jungle" personalized book 142. FIG. 5C illustrates "Animals of the Nativity" having the cartoonized avatar of the subject integrated therein.

Figure 6B:
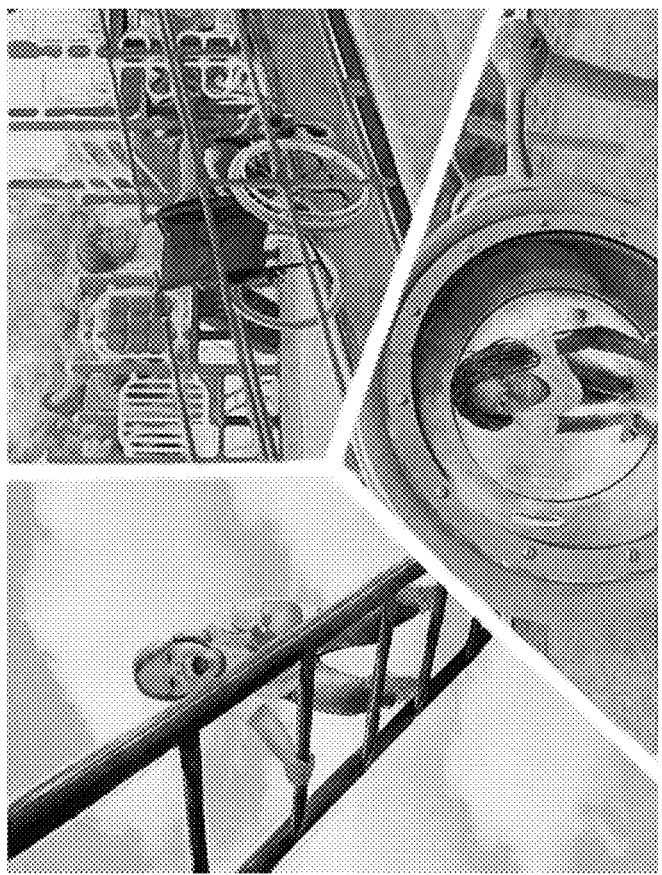
FIG. 6B illustrates example pages of a personalized children's book into which a personalized illustration (avatar) of the child subject is integrated in accordance with some embodiments of the present inventive concept.
Figure 6A:
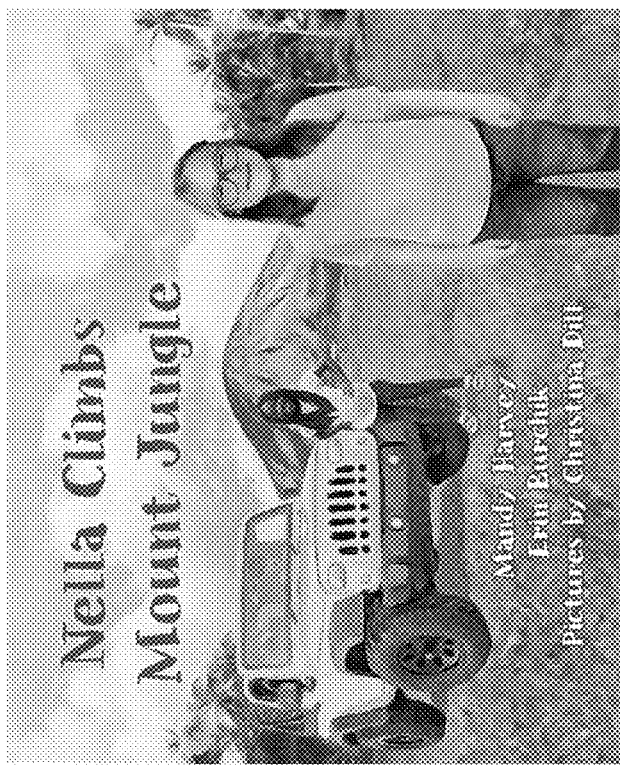
FIG. 6A illustrates an example of a cover of a personalized book in accordance with some embodiments of the present inventive concept.

Similarly, FIGS. 6A and 6B illustrate a cover and pages of a personalized book 142 into which the personalized photo-realistic avatar 140 of the child (i.e., the subject 107) is integrated. The book personalization application 112 may use filter-based, human- and/or technology-powered illustration methods. Accordingly, the personalized book 142 may be created, which may be a personalized children's book 142.

Referring now to FIG. 2B, a flowchart illustrating an example of a method 201 of using the personalization system for providing a personalization platform wherein a base photo-input is subject to the personalization platform to populate the base character and that character is used as an input in a personalized and targeted, marketing campaign direct to a consumer. As illustrated in FIG. 2B, operations begin at block 205 by downloading a batch of photo images from a repository. The batch of photo images are input into (block 215) processed by (block 225) the personalization application in accordance with embodiments discussed herein. The personalized illustrations output from the personalization system and the names of those associated with the personalized illustrations may be put into, for example, an email template (block 235). A personalized email may be sent directly to the consumer including the personalized illustration and the name of the subject (block 245). When received, the user may click an embedded link to the site and navigate the site (block 255). The various features of the personalized illustration may be adjusted as discussed above (block 270 and 275). The user may then review and/or approve the personalized illustration (block 280). The user may select an item to be personalized for the selected subject (block 285) and the personalized illustration may be integrated as discussed above (block 290).

Thus, with methods of FIG. 2B, the creation of personalized images can be used to show example ways to demonstrate to specific target consumers the uses of the personalized images. For example, the method can be used to send specific personalized correspondence direct to consumers or the method can be used to show examples of items that feature the personalized image. For example, a user may generate sample items featuring a personalized image or the sample item featuring the personalized image may be generated automatically and presented to customer. Such personalized items can include, but are not limited to, a book, keychain, phone case, phone grip, mouse, mousepad, laptop case, pillow, bean bag, tableware (e.g., placemats, plates, bowls, etc.), drinkware (e.g., mugs, cups, glasses, water bottles, tumblers, drink holders (koozies), etc.), bottle openers, lunch box/bag, back pack, calendar, greeting card, stationary, invitation, journal, notebook, folder, notepad, stickers, pencil, print, poster, wall art, wall decal, yearbook, woodcut, ornament, keepsake box, jewelry, luggage, tote bag, hat, clothing (such as shirts, jackets, pants, shorts, socks, pajamas, etc.), blanket, towel, mask, toy (such as a doll, stuffed animal, bobblehead, puzzles, games, playing cards, etc.), party favor, marketing material, electronic image (e.g., emojis) and other specialty items.

Figure 3:
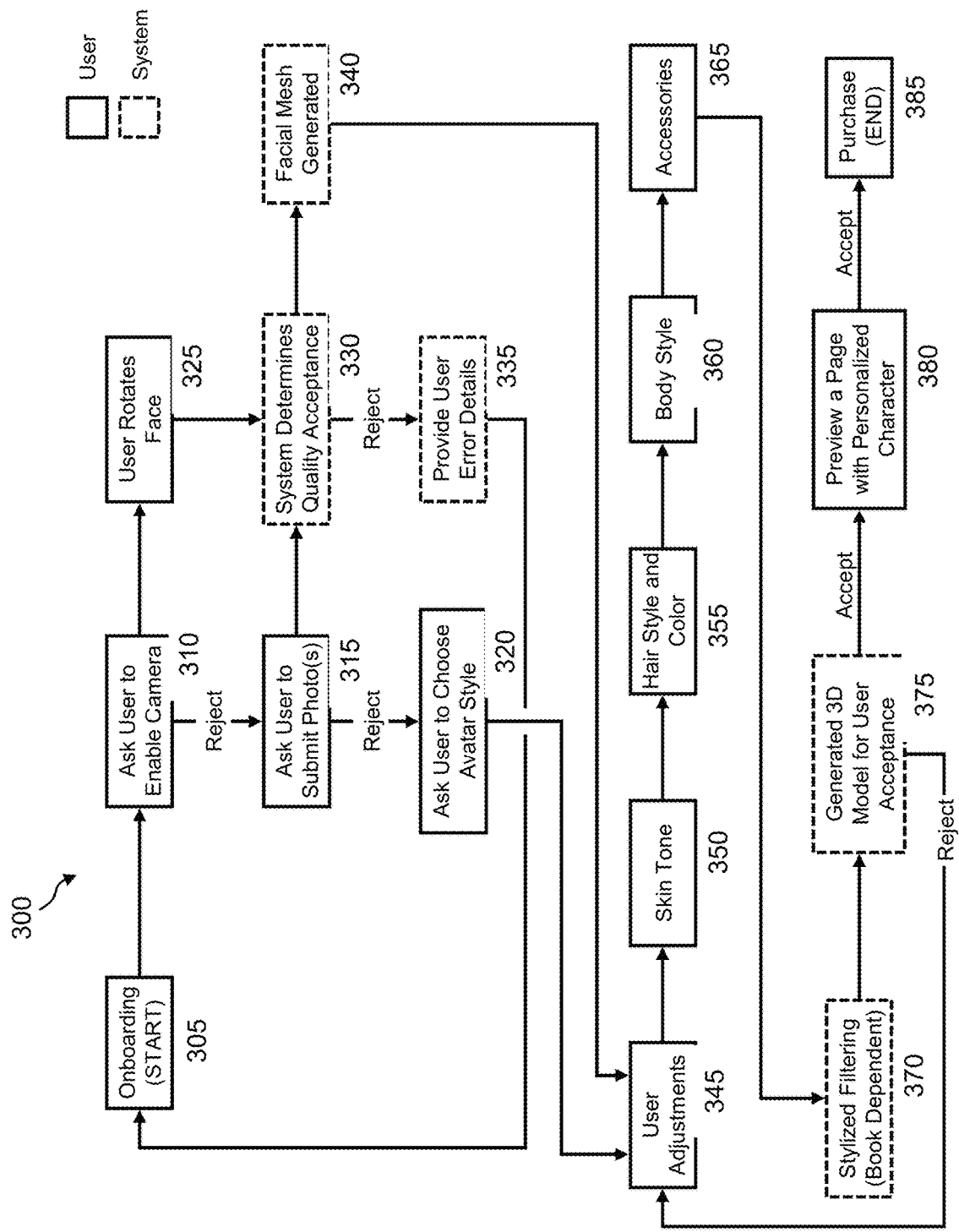
FIG. 3 is a block diagram illustrating a method of using a book personalization system for providing a children's book personalization platform in accordance with some embodiments of the present inventive concept.

Referring now to FIG. 3, a block diagram of an example of a method 300 of using the presently disclosed personalization system 100 shown in FIG. 1 for providing a personalization platform will be discussed. The method illustrates in FIG. 3 is substantially similar to the process of FIG. 2A discussed above. Generally, the personalization system 100 in accordance with embodiments of the present inventive concept shown in FIG. 1 and methods 200, 201 and 300 depict a fully automated and optimized personalization system leveraging a neural network and library of facial assets.

Referring now to FIG. 3, as illustrated, the system 300 contains aspects that are performed by the system indicated by dotted line boxes and aspects that are performed by the user indicated by solid line boxes. It will be understood that FIG. 3 is provided for example only and that boxes that are indicated as being performed by the system may be performed by the user in some embodiments and vice versa.

As illustrated, after onboarding (block 305), one or more photos is obtained using a camera and/or provision of a photo(s) by a user (blocks 310 and 315) or some combination of the two. In further embodiments, a user may just select an avatar style (block 320). Depending on the method chosen, the user and/or system may make various adjustments (blocks 325, 330, 335 and/or 340) and the outputs may be provided to block 345 where the user makes adjustments to, for example, skin tone (350), hair style and color (355), body style (360), accessories (365) and the like. Once the adjustments have been made, based upon the personalized item, the system filters the personalized illustration so that the personalized illustration appears integrated with the personalized item (block 370). Once complete, the user can either accept or reject the personalized item (block 375). If rejected, operations may repeat until the personalized illustration is accepted (block 375). The final personalized item may be previewed (block 380) before being accepted and purchased (block 385).

Referring now to FIG. 7 through FIG. 17, screenshots of the GUI of the personalization system in accordance with some embodiments of the present inventive concept will be discussed. Although FIGS. 7 through 17 are directed to book personalization, as discussed above, embodiments of the present inventive concept are not limited thereto.

Figure 7:
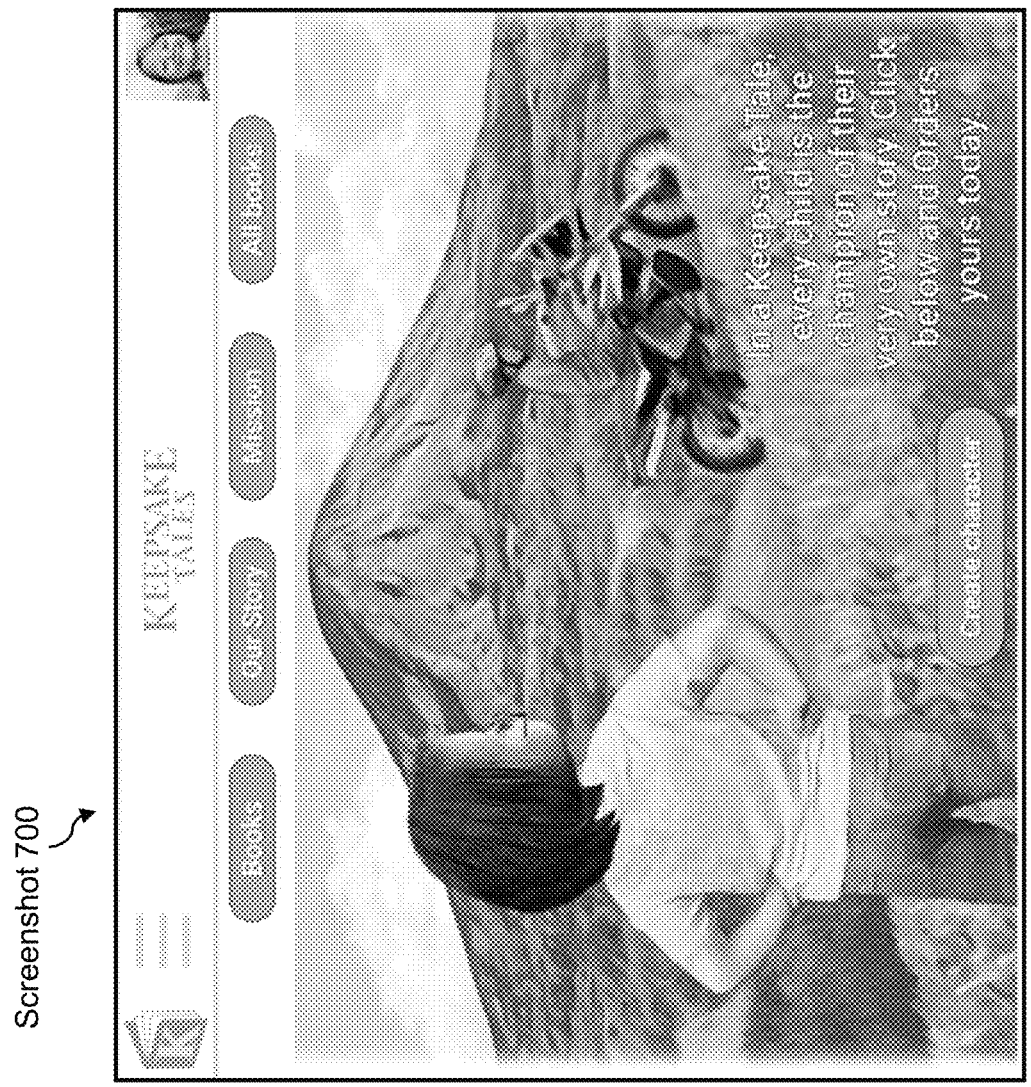
Figure 8:
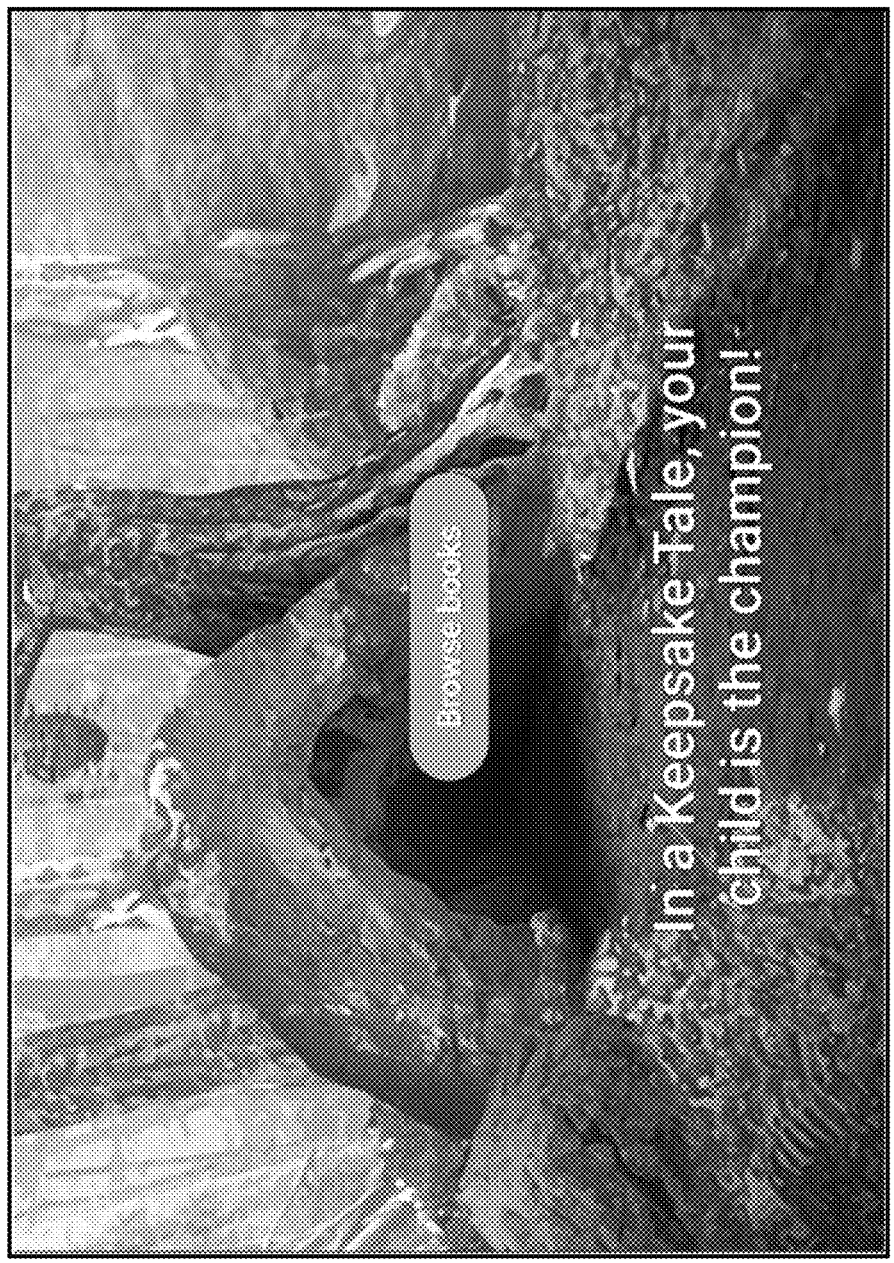
Figure 9:
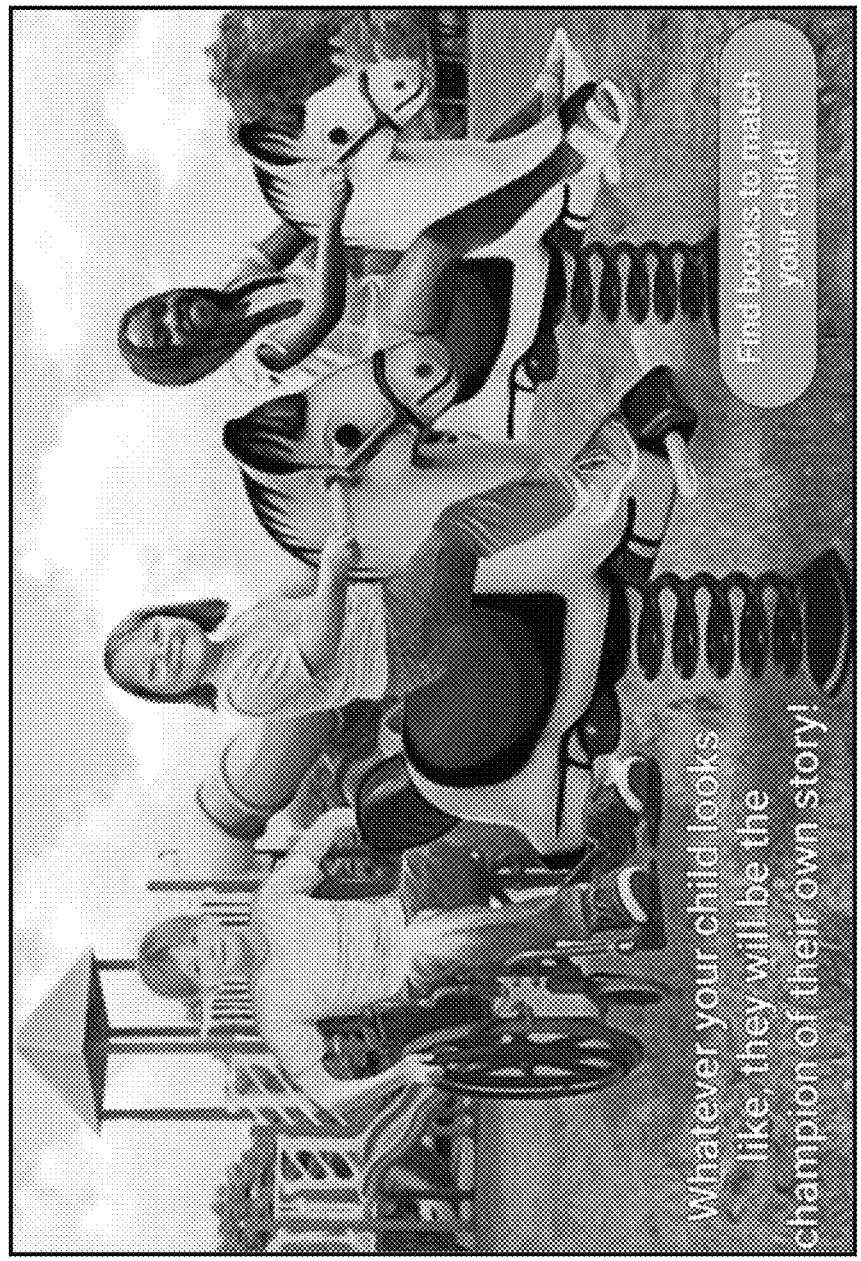
Figure 11:
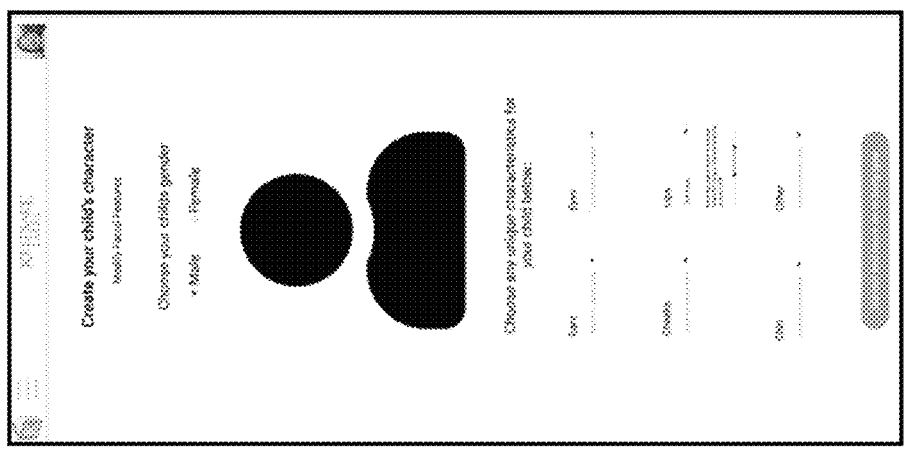
Figure 12:
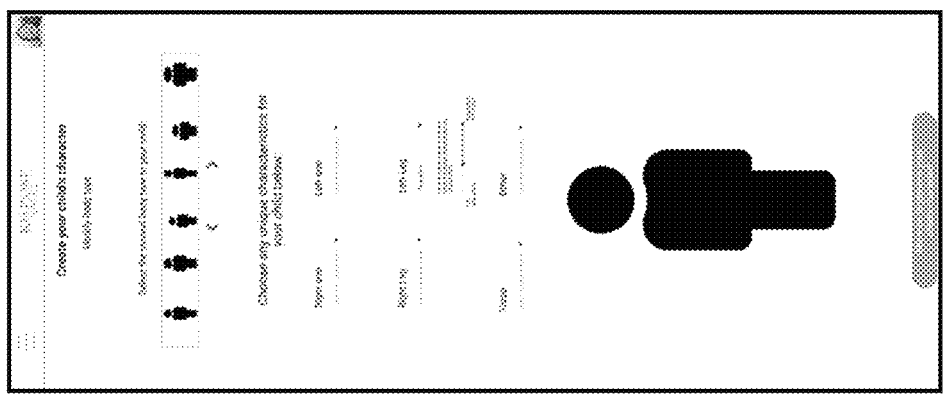
Figure 13:
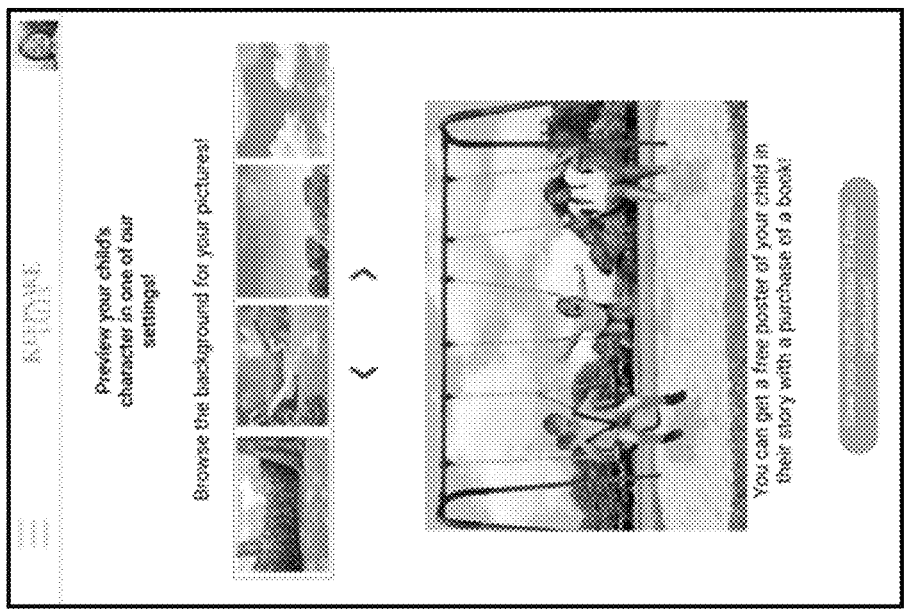
Figure 14:
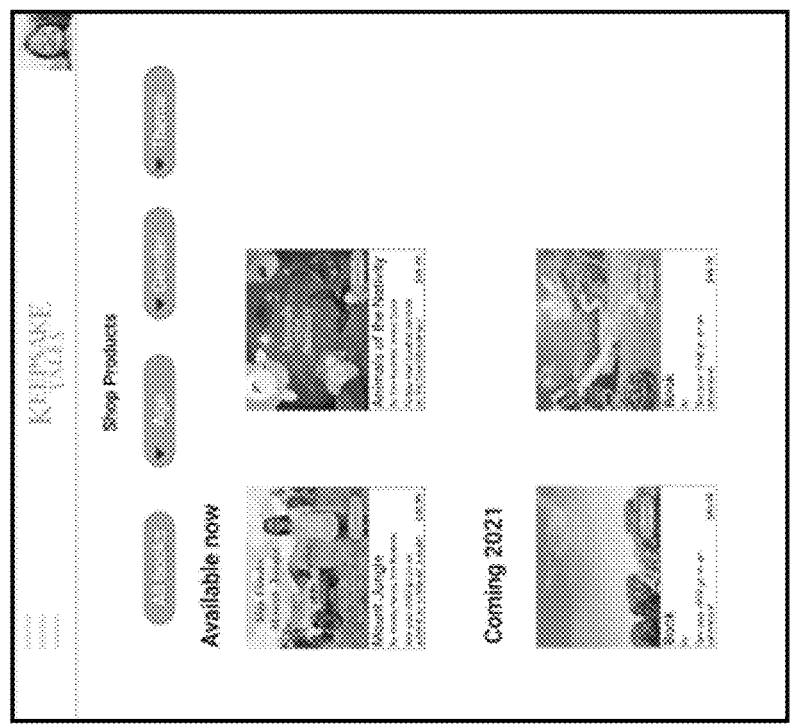
Figure 15:
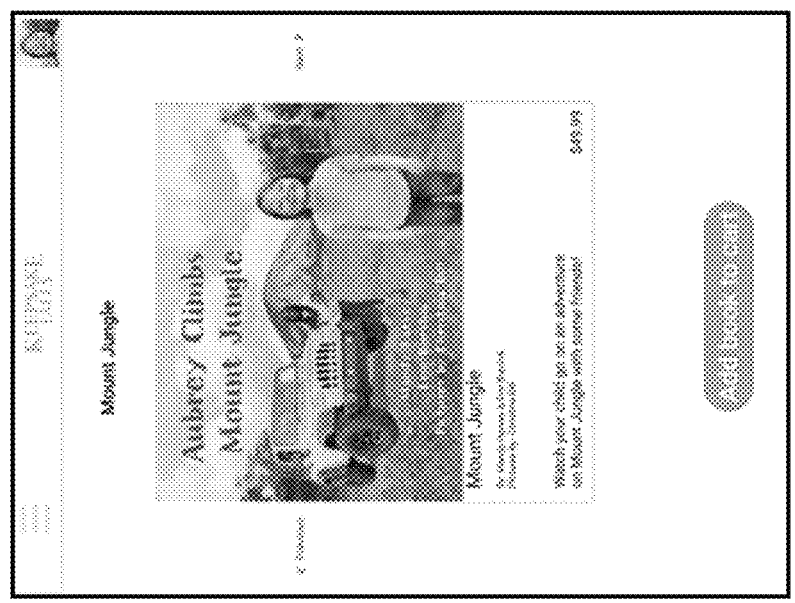
Figure 16:
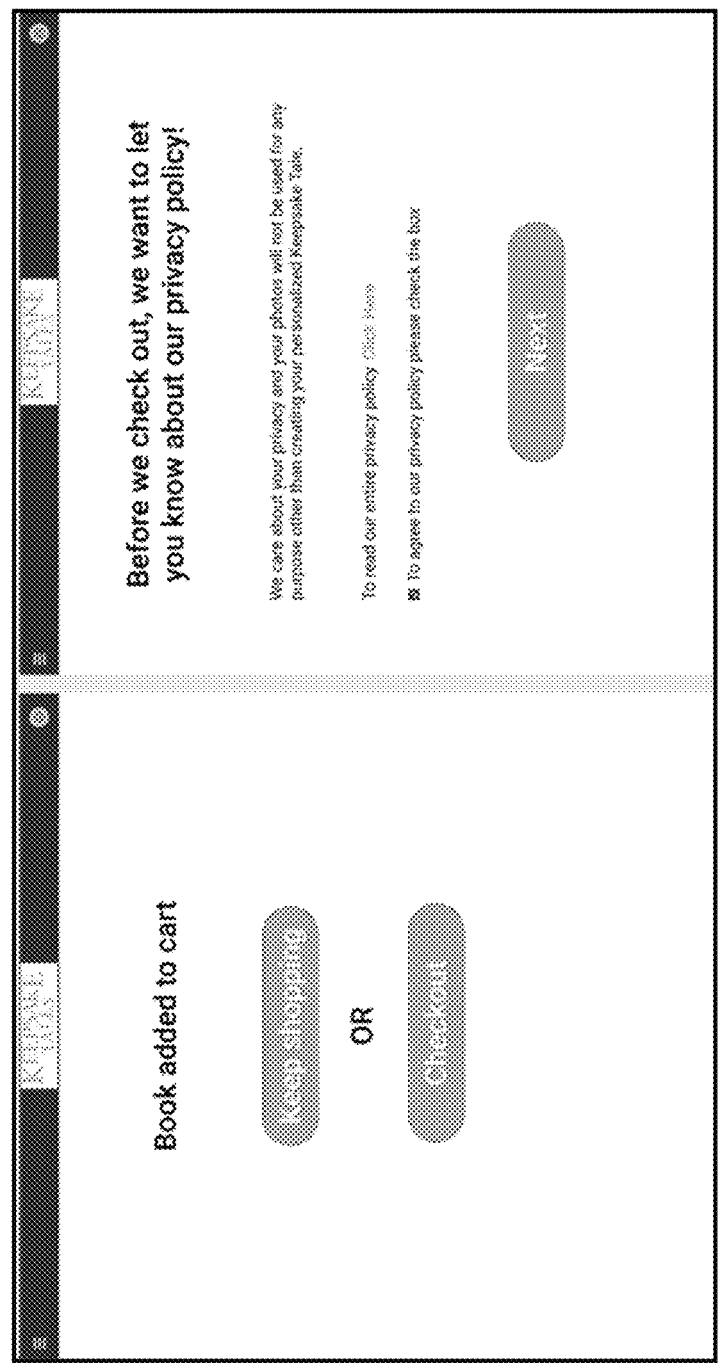
Figure 17:
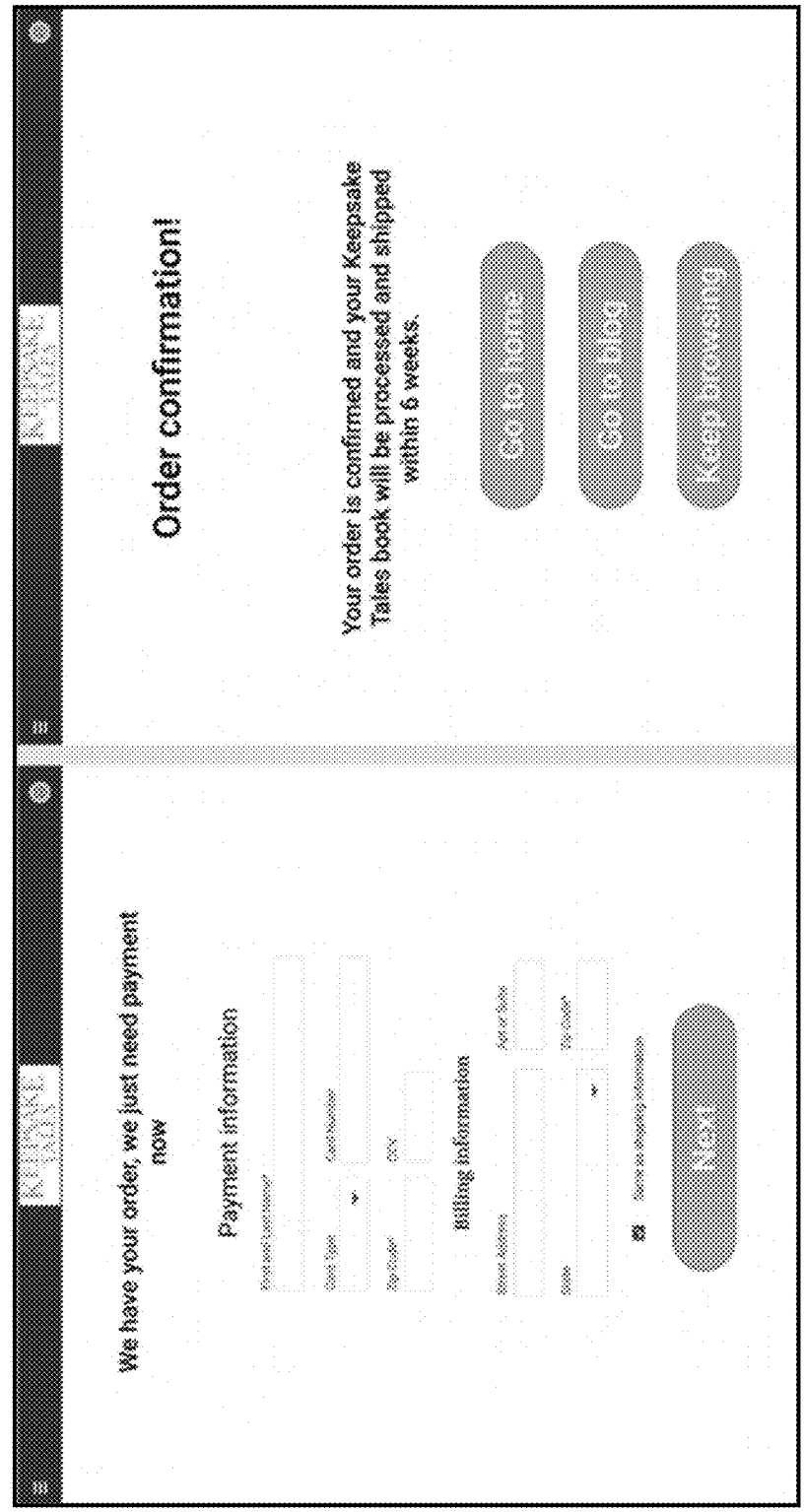

Referring first to FIG. 7, a screenshot 700 illustrating an example of a "Homepage" of the book personalization application 112/112' is illustrated. FIG. 8 is a screenshot 805 showing an example of the "story selection" screen (step 245 of method 200) of the book personalization application 112/112'. FIG. 9 is a screenshot 910 showing another example of the "story selection" screen (step 245 of method 200) of the book personalization application 112/112'. FIG. 10 is a screenshot 1015 showing an example of the "character builder-upload" screen (steps 225, 230 of method 200) of the book personalization application 112/112'. FIG. 11 is a screenshot 1120 showing an example of the "character builder-modify facial features" screen (step 230 of method 200) of book personalization application 112/112'. FIG. 12 is a screenshot 1225 showing an example of the "character builder-select body type" screen (step 235 of method 200) of book personalization application 112/112'. FIG. 13 is a screenshot 1330 showing an example of the "preview" screen (step 240 of method 200) of book personalization application 112/112'. FIG. 14 is a screenshot 1435 showing an example of multiple stories that are available in story library 138 (step 245 of method 200) of book personalization application 112/112'. FIG. 15 is a screenshot 1540 showing an example of one particular story that is available in story library 138 (step 245 of method 200) of book personalization application 112/112'. FIG. 16 is a screenshot 1645 showing an example of a "checkout" screen of book personalization application 112/112'. FIG. 17 is a screenshot 1750 showing an example of an "order confirmation" screen of book personalization application 112/112'.

As discussed above, although the personalization platform and method of developing the same as described herein are particularly exemplified for use in personalizing children's books, it would be understood and appreciated by one of skill in the art that this personalization platform has uses for multiple applications including, but not limited to, a non-children's book, keychain, phone case, phone grip, mouse, mousepad, laptop case, pillow, bean bag, tableware (e.g., placemats, plates, bowls, etc.), drinkware (e.g., mugs, cups, glasses, water bottles, tumblers, drink holders (koozies), etc.), bottle opener, lunch box/bag, back pack, calendar, card, stationary, invitation, journal, notebook, folder, notepad, stickers, pencil, print, poster, wall art, wall decal, yearbook, woodcut, ornament, keepsake box, jewelry, luggage, tote bag, hat, clothing (such as shirts, jackets, pants, shorts, socks, pajamas, etc.), blanket, towel, mask, toy (such as a doll, stuffed animal, bobblehead, puzzles, games, playing cards, etc.), party favor, marketing material, electronic image (e.g., emojis) and other specialty items and uses.

Figure 18:
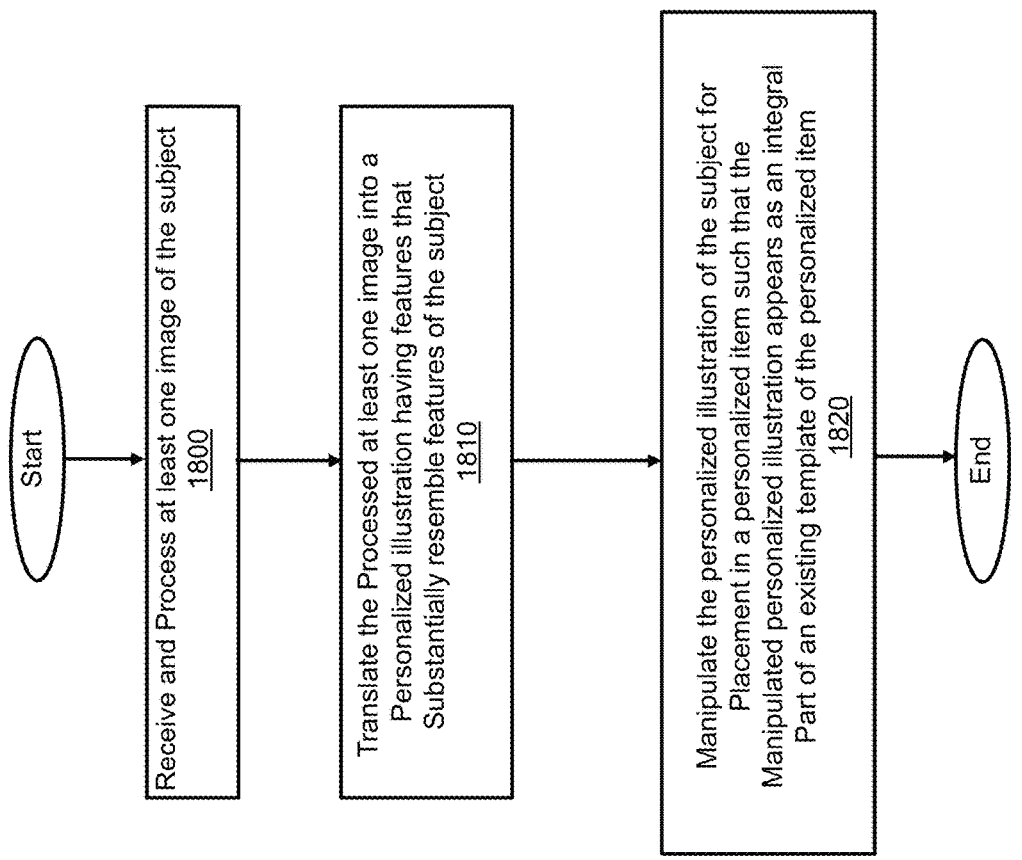
FIG. 18 is a flowchart illustrating operations for creating personalized items using images associated with a subject in accordance with some embodiments of the present inventive concept.

Referring now to the flowchart of FIG. 18, a method for creating personalized items using images associated with a subject will be discussed. As illustrated in FIG. 18 operations begin at block 1800 by receiving and processing at least one image of a subject. As discussed above, the image(s) may be captured by the system or provided to the system from an external source. The processed at least one image is translated into a personalized illustration having features that substantially resemble features of the subject (block 1810). The processed image(s) is translated by extracting a plurality of core shapes from a face of the subject in the at least one image and assembling the extracted plurality of core shapes into a face of the personalized illustration. The core shapes may include, for example, a face shape, a nose shape, eye shapes and ear shapes. Once the core shapes are extracted, the extracted plurality of core shapes may be assembled into the face of the personalized illustration.

The personalized item may be, for example, a children's book, a non-children's book, magazine, keychain, phone case, phone grip, mouse, mousepad, laptop case, pillow, bean bag, tableware, drinkware, bottle opener, lunch box/bag, back pack, calendar, greeting card, stationary, invitation, journal, notebook, folder, notepad, stickers, pencil, print, poster, wall art, wall decal, yearbook, woodcut, ornament, keepsake box, jewelry, luggage, tote bag, hat, clothing, blanket, towel, mask, toy, party favor, marketing material and/or electronic image.

Once created, the personalized illustration of the subject may be manipulated for placement in a personalized item such that the manipulated personalized illustration appears as an integral part of an existing template of the personalized item (block 1820). Manipulating the personalized image, as discussed above, may include, for example, adjusting emotion of the personalized illustration to reflect a mood of the personalized item; adjusting a location of the personalized illustration on the personalized item to integrate with the existing template of the personalized item; aligning the personalized illustration on the personalized item so the personalized illustration is facing in an appropriate direction to integrate with the personalized item; and/or adjusting a size of the personalized illustration to match relative sizes of elements depicted on the personalized item.

In some embodiments, the personalized illustration may be customized by adjusting at least one of a skin tone of the face, an eye color of the subject and a hair style of the subject. The user may also select a body type representative of the subject and associate the face with the selected body type. Each aspect of the face and body are customizable. For example, the body type may include, for example, tall, thin, short, wide, in a wheel-chair, having a prosthetic limb, having an orthopedic cast, having crutches and having mobility aids.

In some embodiments, the extracted plurality of core shapes from the face of the subject are recognized and matched to corresponding core shapes in an asset library of existing facial assets. The matched core shapes may then be amended into the face of the personalized illustration. The library of existing facial assets is continually updated with more facial assets.

Figure 19:
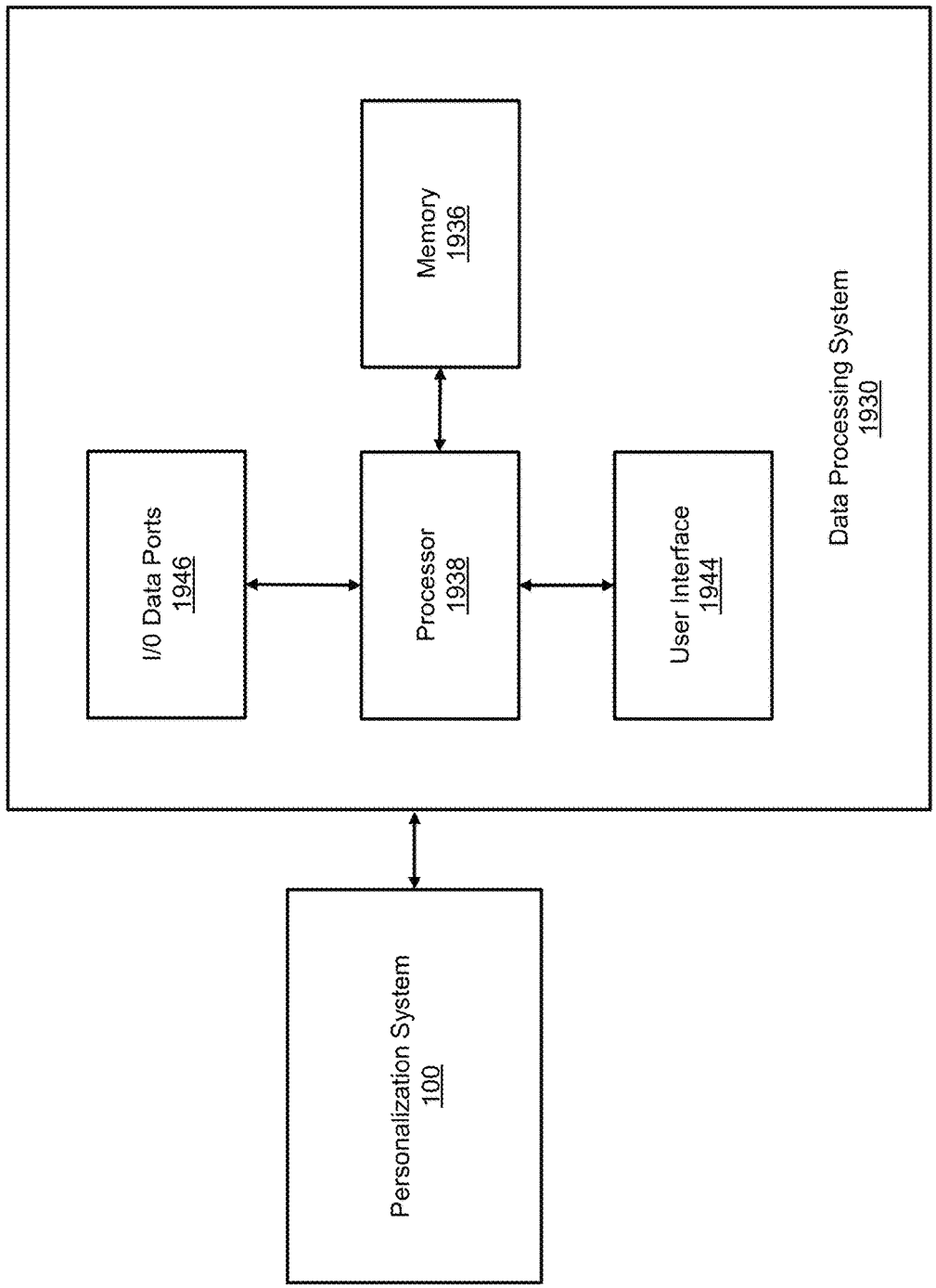
FIG. 19 is a block diagram illustrating a data processing system for use in accordance with some embodiments of the present inventive concept.

As is clear from the details of the present inventive concept, embodiments of the present inventive concept require data processing. Referring now to FIG. 19, an example of a data processing system 1930 suitable for use with any of the examples described above will be discussed.

Although the example data processing system 1930 is shown as in communication with a personalization system 100 in accordance with embodiments of the present inventive concept, the data processing system 1930 may be part of any component of the system without departing from the scope of the present inventive concept. In some examples, the data processing system 1930 can be any suitable computing device for performing operations according to the embodiments discussed herein described herein.

As illustrated, the data processing system 1930 includes a processor 1938 communicatively coupled to I/O components 1946, a user interface 1944 and a memory 1936. The processor 1938 can include one or more commercially available processors, embedded processors, secure processors, microprocessors, dual microprocessors, multi-core processors, other multi-processor architectures, another suitable processing device, or any combination of these. The memory 1936, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 1930.

I/O components 1946 may be used to facilitate wired or wireless connections to devices such as one or more displays, game controllers, keyboards, mice, joysticks, cameras, buttons, speakers, microphones and/or other hardware used to input or output data. Memory 1936 represents nonvolatile storages such as magnetic, optical, or other storage media included in the data processing system and/or coupled to processor 1938.

The user interface 1944 may include, for example, a keyboard, keypad, touchpad, voice activation circuit, display or the like and the processor 1938 may execute program code or instructions stored in memory 1936.

It should be appreciated that data processing system 1930 may also include additional processors, additional storage, and a computer-readable medium (not shown). The processor(s) 1948 may execute additional computer-executable program instructions stored in memory 1936. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

Figure 20:
FIGS. 20 through 27 are screenshots illustrating operations for creating a personalized item in accordance with some embodiments of the present inventive concept.
Figure 21:
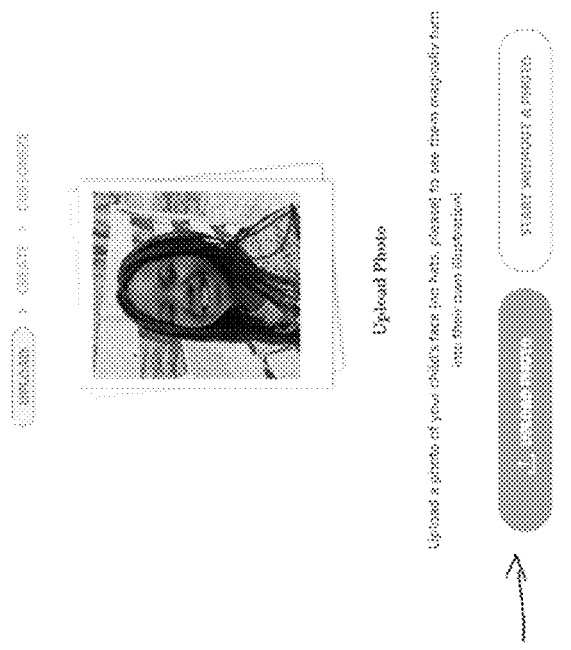
Figure 22:
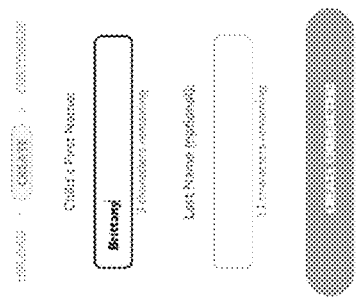

Referring now to FIG. 20, various operations of the present inventive concept will be discussed with respect to various screenshots of GUIs. Referring first to FIG. 20, this GUI illustrates a first step in the process by selecting "Create Character", the process begins. Operations proceed to FIG. 21, wherein at least one photo is provided of the subject. As discussed above, the photo may be obtained using the system or using an external image capture device without departing from the scope of the present inventive concept. Once the photo or photos is uploaded, the subject's name may be entered as shown in FIG. 22.

Figure 24:
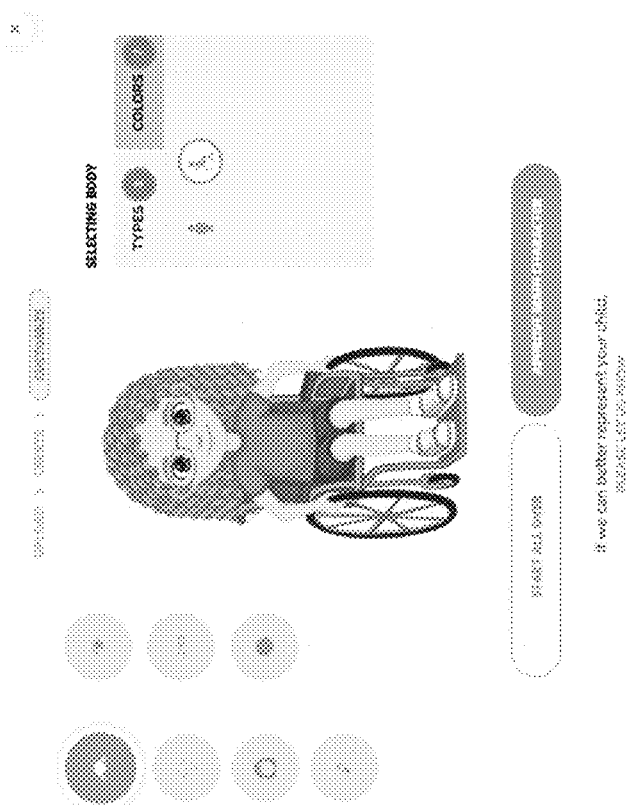
Figure 23:
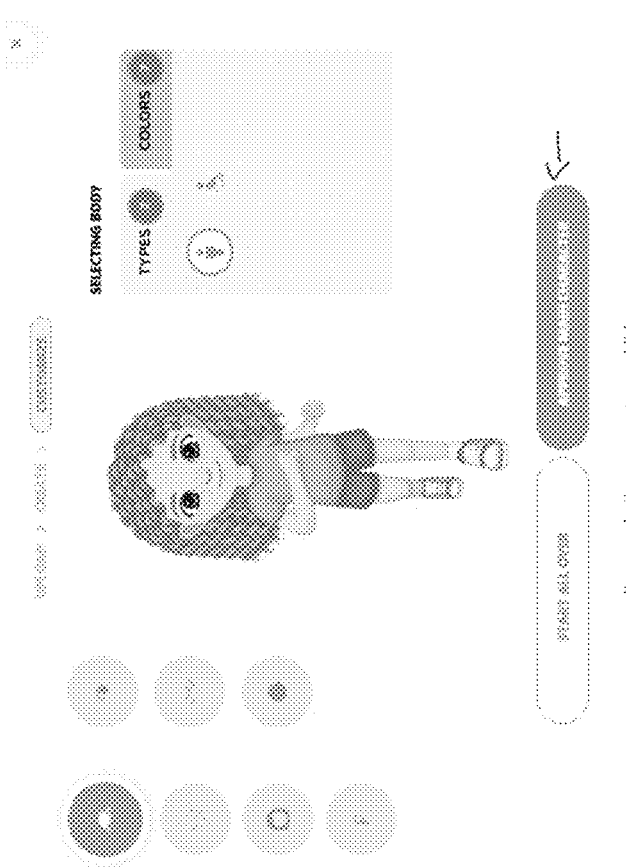
Figure 25A:
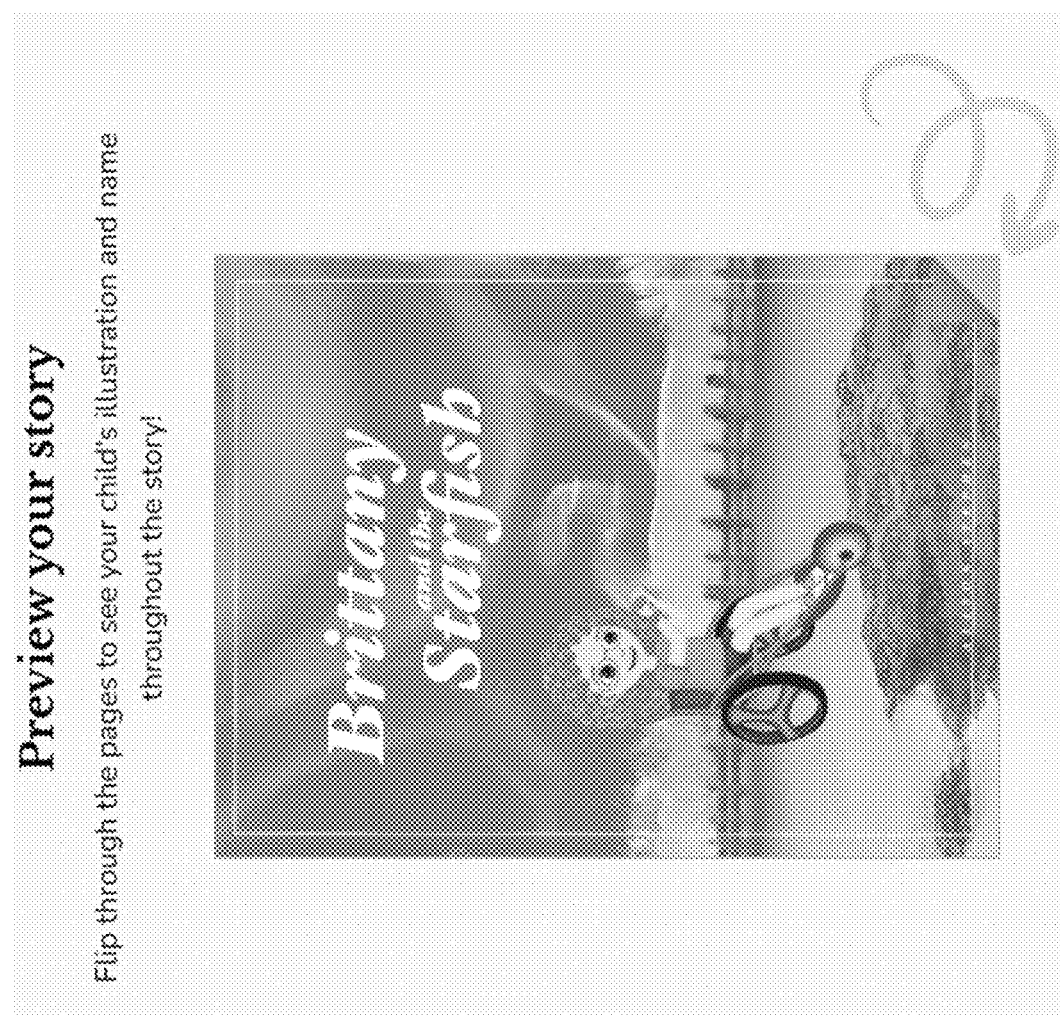
Figure 25B:
Figure 25C:
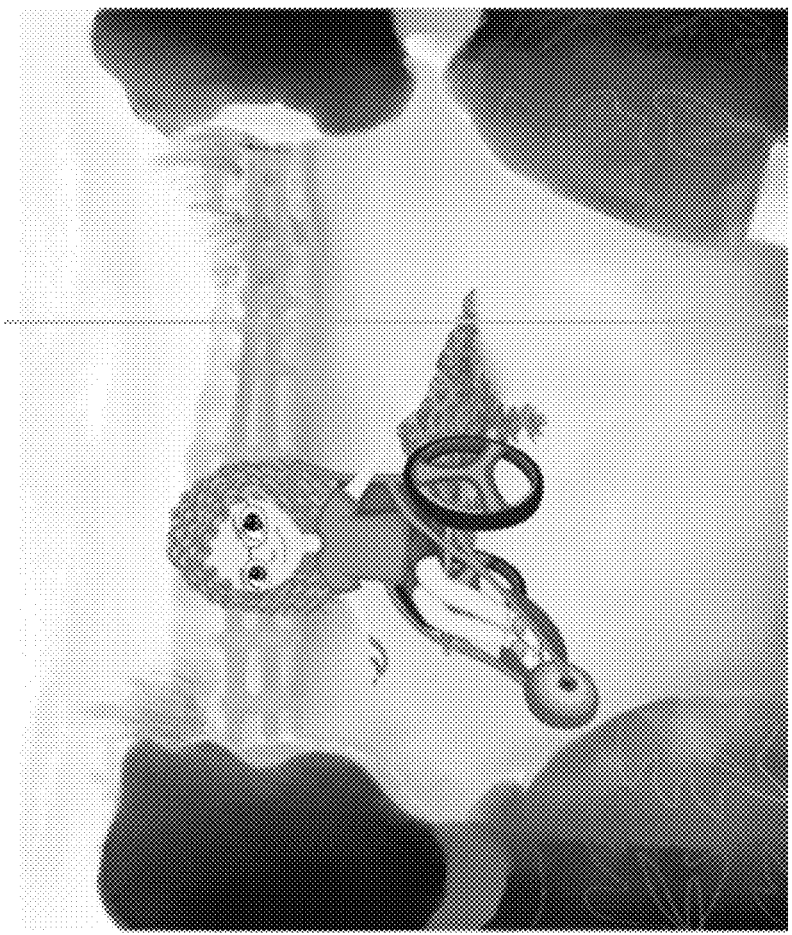
Figure 25D:
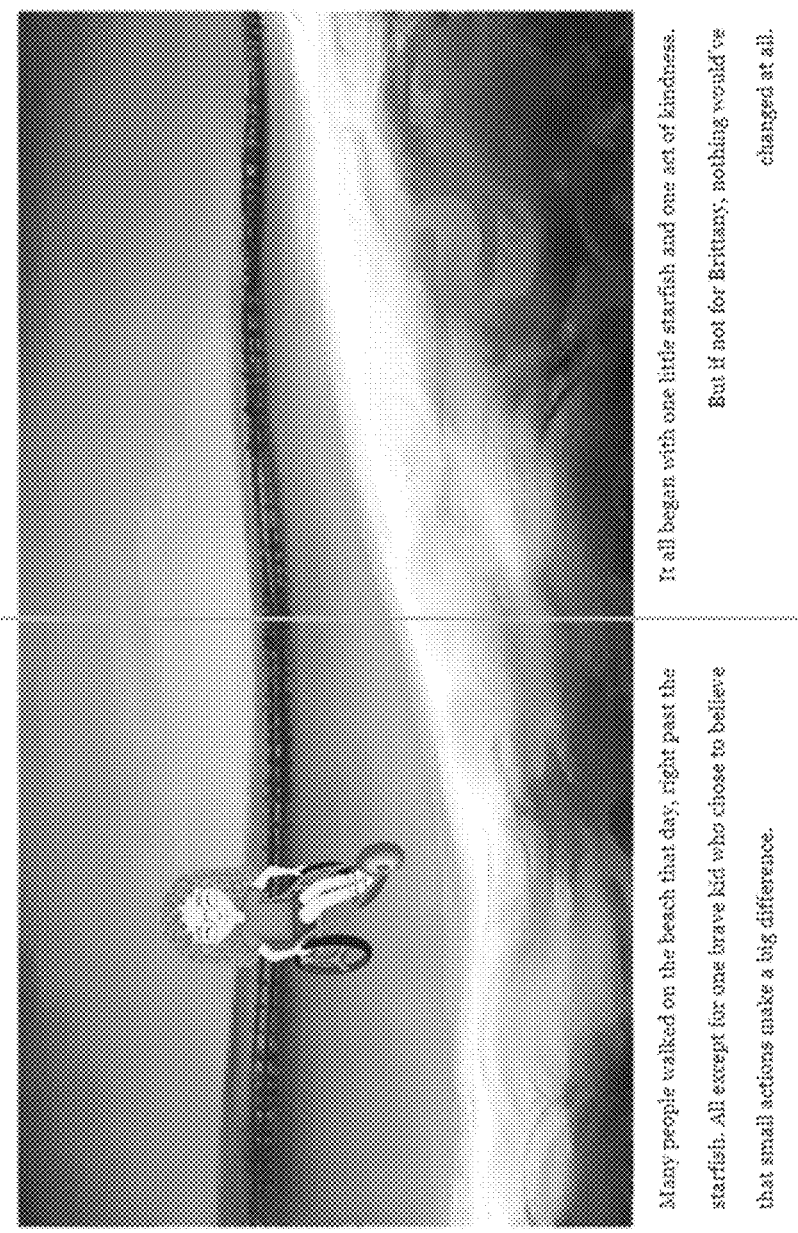

Creation of the personalized illustration will now be discussed with respect to FIGS. 23 and 24. As illustrated in FIG. 23, an illustration is provided that is representative of the subject in the photo(s) and is not photo realistic. A user has an opportunity to approve the illustration or, as shown in FIG. 23, make desired changes by adjusting, for example, the body type, skin tone, eye shape, eye color, freckles, glasses, hairstyle, hair color, face shape, hearing devices, and the like. In particular, FIG. 24 modifies the illustration in FIG. 23 by placing the subject in a wheelchair, removing freckles, adding glasses and pink hearing aids. Thus, embodiments of the present inventive concept allow a user to customize the personalized illustration to further resemble the subject.

Referring now to FIGS. 25A through 25D, once the user has approved the "personalized illustration," the personalized illustration may be integrated into the personalized item, for example, pages of a book. FIGS. 25A through 25D illustrated a book cover and various pages of the book having the personalized illustration in accordance with various embodiments of the present inventive concept illustrated therein. As illustrated, the facial expressions, positioning, size and the like of the personalized illustration is modified to integrate into each particular page/cover so it looks as if it has always been there.

Figure 26:
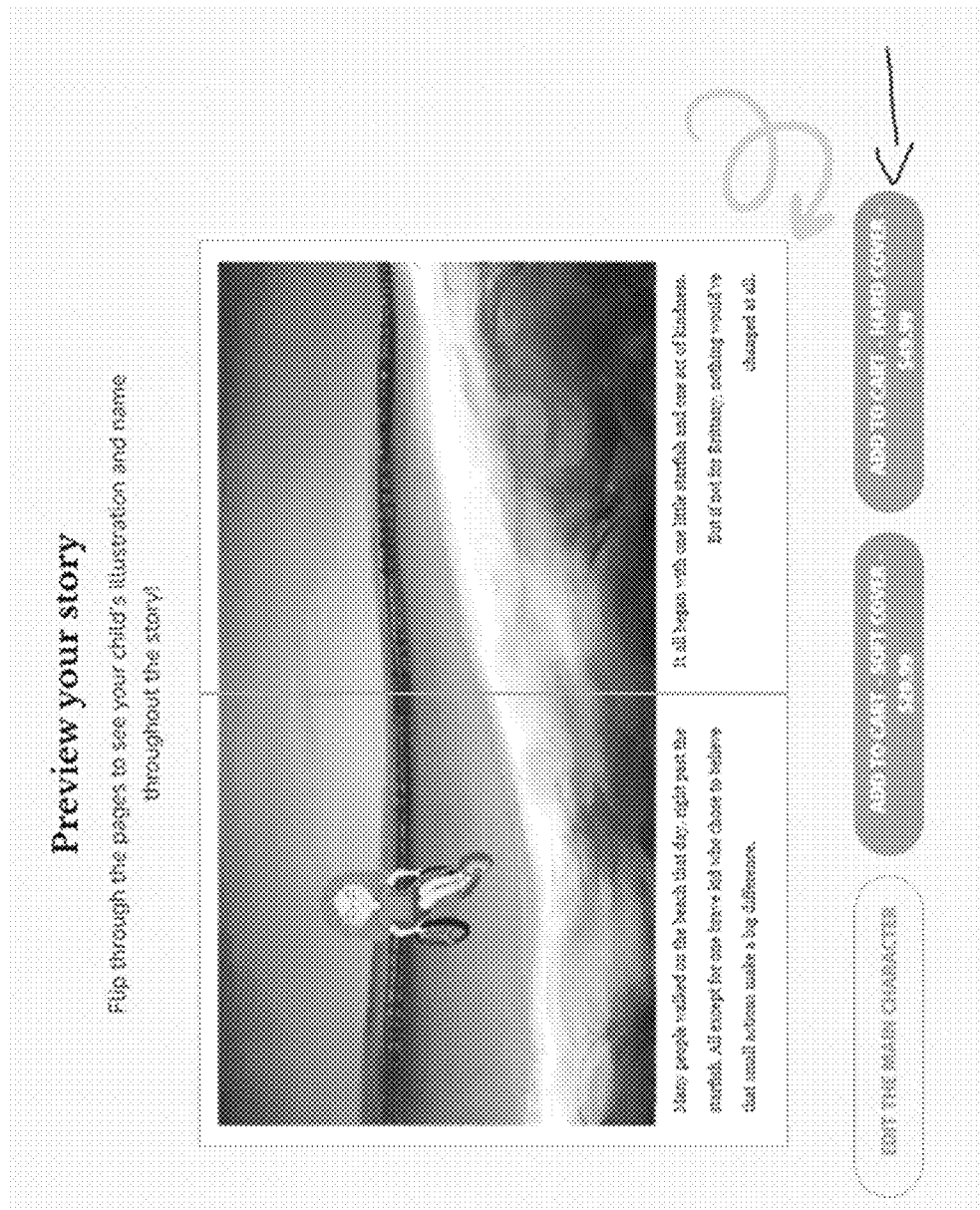

Once the user decides everything is the way they want it, a checkout process may be initiated. For example, the personalized item may be added to the cart and the personalized item may be previewed before the purchase is finalized as shown in FIG. 26.

Figure 27:
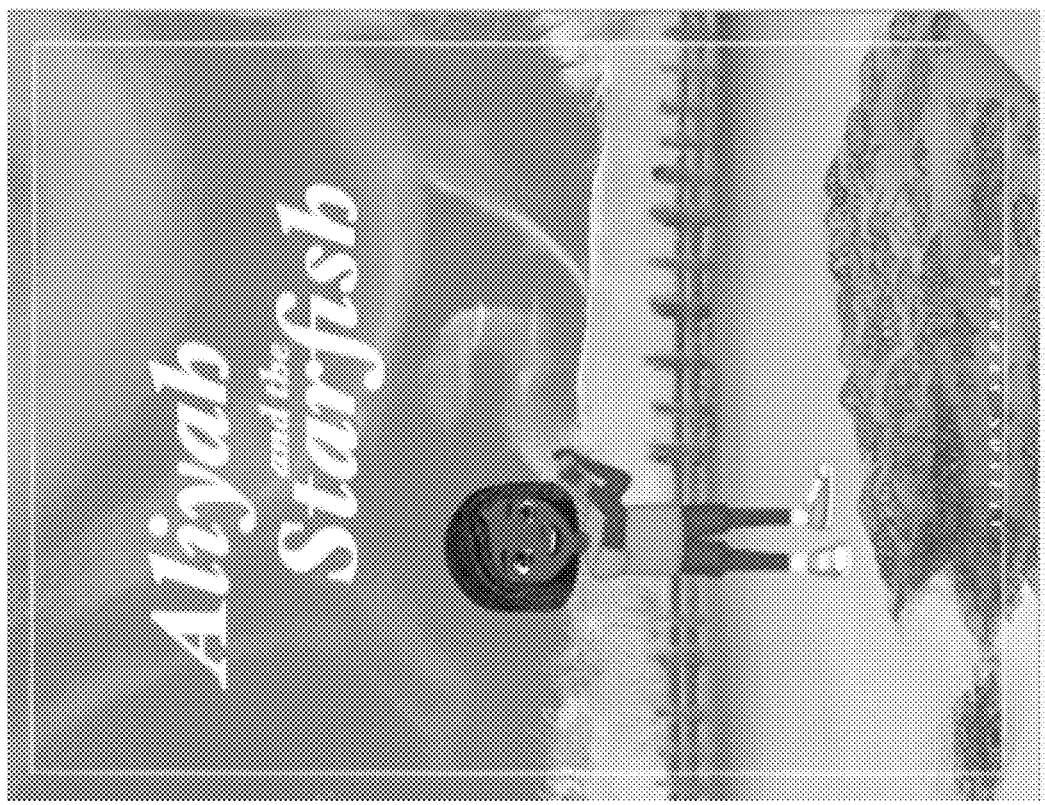

It will be understood that the character can be edited at any time. For example, a new personalized illustration may be used as shown in FIG. 27. Once the product is reviewed, the user can Checkout, the book is printed and delivered to the user/customer.

As discussed briefly above, some embodiments of the present inventive concept provide methods for creating a personalized illustration and positioning that personalized illustration into or onto a personalized item. When positioned, the personalized illustration appears as a seamlessly or "visually integrated" part of the background element(s) of the personalized item or the personalized item itself as if the personalized illustration has always been there as a "cohesive" portion of the personalized item in contrast to conventional personalized illustrations that are applied to or physically integrated into a medium without regard to visual integration. That is, the present inventive concept provides physical and visual integration of the personalized illustration into or onto a personalized item to provide a final cohesive product.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

That which is claimed:

1. A method for creating personalized items using images associated with a subject, the method comprising:
   receiving and processing at least one image of the subject;
   translating the processed at least one image into a personalized illustration having features that substantially resemble features of the subject, wherein translating the processed at least one image comprises extracting a plurality of core shapes from a face of the subject in the at least one image and assembling the extracted plurality of core shapes into a face of the personalized illustration that is completely different from the received at least one image; and
   manipulating the personalized illustration of the subject for placement in a personalized item such that the manipulated personalized illustration appears as an integral part of an existing template of the personalized item,
   wherein at least one of receiving, translating and manipulating are performed by at least one processor;
   wherein translating comprises translating from the received at least one image to the personalized illustration using one of a vectorized approach and/or a machine learning approach; and
   wherein the machine learning approach comprises recognizing different facial features in the received at least one image and matching the recognized different facial features to a correct permutation of pre-created facial assets to provide the personalized illustration.

2. The method of claim 1, wherein manipulating comprises one or more of:
   adjusting emotion of the personalized illustration to reflect a mood of the personalized item;
   adjusting a location of the personalized illustration on the personalized item to integrate with the existing template of the personalized item;
   aligning the personalized illustration on the personalized item so the personalized illustration is facing in an appropriate direction to integrate with the personalized item; and
   adjusting a size of the personalized illustration to match relative sizes of elements depicted on the personalized item.

3. The method of claim 1, wherein the plurality of core shapes comprise a face shape, a nose shape, eye shapes and/or ear shapes, the method further comprising assembling the extracted plurality of core shapes into the face of the personalized illustration.

4. The method of claim 3, further comprising customizing at least one of a skin tone of the face, an eye color of the subject and a hair style of the subject.

5. The method of claim 4, further comprising:
   selecting a body type representative of the subject; and
   completing the personalized illustration of the subject by associating the face with the selected body type.

6. The method of claim 5, wherein each aspect of the face and the body type of the personalized illustration is customizable.

7. The method of claim 6:
   wherein the body type comprises one or more of tall, thin, short, wide, in a wheel-chair, having a prosthetic limb, having an orthopedic cast, having crutches and having mobility aids; and
   wherein customizing the face comprises one or more of adding cochlear implants, hearing aids, glasses, freckles, cleft palate beauty marks and braces.

8. The method of claim 6, further comprising customization of the personalized illustration by a user.

9. The method of claim 1, wherein translating the processed at least one image further comprises:
   recognizing the extracted plurality of core shapes from the face of the subject;
   matching the recognized extracted plurality of core shapes of the face of the subject to corresponding core shapes in an asset library of existing facial assets; and
   assembling the matched core shapes into the face of the personalized illustration.

10. The method of claim 9, wherein the asset library of existing facial assets is continually updated with more facial assets.

11. The method of claim 1, wherein the manipulated personalized illustration is highly representative of the subject and is cohesive with a background illustration of the personalized item.

12. The method of claim 1, wherein the at least one image of the subject is one of a digital photograph or a digital representation of a physical photograph.

13. The method of claim 1, wherein the personalized item comprises a children's book, a non-children's book, magazine, keychain, phone case, phone grip, mouse, mousepad, laptop case, pillow, bean bag, tableware, drinkware, bottle opener, lunch box/bag, back pack, calendar, greeting card, stationary, invitation, journal, notebook, folder, notepad, stickers, pencil, print, poster, wall art, wall decal, yearbook, woodcut, ornament, keepsake box, jewelry, luggage, tote bag, hat, clothing, blanket, towel, mask, toy, party favor, marketing material and/or electronic image.

14. The method of claim 13:
   wherein the personalized item is a book; and
   wherein the personalized illustration is integrated on pages of the book such that the personalized illustration appears as an integral part of the pages of the book.

15. The method of claim 1, wherein the vectorized approach comprises processing the received at least one image of the subject to extract the core shapes from the face and reassembling associated vectors into the personalized illustration, wherein skin-tone is also extracted from the face in the received at least one image and applied to the personalized illustration automatically.

16. A personalization system for creating personalized items using images associated with a subject, the personalization system comprising:
   a non-transitory computer-readable medium;
   a processor in communication with the non-transitory computer-readable medium, the processor configured to:
      receive and process at least one image of the subject;
      translate the processed at least one image into a personalized illustration having features that substantially resemble features of the subject by extracting a plurality of core shapes from a face of the subject in the at least one image and assembling the extracted plurality of core shapes into a face of the personalized illustration that is completely different from the received at least one image; and
      manipulate the personalized illustration of the subject for placement in a personalized item such that the manipulated personalized illustration appears as an integral part of an existing template of the personalized item,
   wherein the processor is configured to translate from the received at least one image to the personalized illustration using one of a vectorized approach and/or a machine learning approach; and
   wherein the machine learning approach comprises recognizing different facial features in the received at least one image and matching the recognized different facial features to a correct permutation of pre-created facial assets to provide the personalized illustration.

17. The personalization system of claim 16, the processor is further configured to:
   adjust emotion of the personalized illustration to reflect a mood of the personalized item;
   adjust a location of the personalized illustration on the personalized item to integrate with the existing template of the personalized item;
   align the personalized illustration on the personalized item so the personalized illustration is facing in an appropriate direction to integrate with the personalized item; and
   adjust a size of the personalized illustration to match relative sizes of elements depicted on the personalized item.

18. The personalization system of claim 16, wherein the plurality of core shapes comprise at least one of a face shape, a nose shape, eye shapes and ear shapes, the method further comprising assembling the extracted plurality of core shapes into the face of the personalized illustration.

19. The personalization system of claim 16, further comprising selecting a body type representative of the subject; and
   completing the personalized illustration of the subject by associating the face with the selected body type.

20. The personalization system of claim 16, wherein the processor is further configured to:
   recognize the extracted plurality of core shapes from the face of the subject;
   match the recognized extracted plurality of core shapes of the face of the subject to corresponding core shapes in an asset library of existing facial assets; and
   assemble the matched core shapes into the face of the personalized illustration.

21. A computer for creating and testing voice and/or messaging applications, the computer comprising:
   one or more memories;
   one or more processors, communicatively coupled to the one or more memories, the one or more processors configured to:
      receive and process at least one image of a subject;
      translate the processed at least one image into a personalized illustration having features that substantially resemble features of the subject by extracting a plurality of core shapes from a face of the subject in the at least one image and assembling the extracted plurality of core shapes into a face of the personalized illustration that is completely different from the received at least one image; and
      manipulate the personalized illustration of the subject for placement in a personalized item such that the manipulated personalized illustration appears as an integral part of an existing template of the personalized item,
   wherein the one or more processors are configured to translate from the received at least one image to the personalized illustration using one of a vectorized approach and/or a machine learning approach; and
   wherein the machine learning approach comprises recognizing different facial features in the received at least one image and matching the recognized different facial features to a correct permutation of pre-created facial assets to provide the personalized illustration.

* * * * *